United States Patent
Nakamura

(10) Patent No.: US 10,652,433 B2
(45) Date of Patent: *May 12, 2020

(54) IMAGE FORMING APPARATUS, IMAGE FORMING SYSTEM, METHOD OF CALIBRATING IMAGE DETECTION UNIT, AND POST-PROCESSING APPARATUS

(71) Applicant: Konica Minolta, Inc., Chiyoda-ku, Tokyo (JP)

(72) Inventor: Mitsunori Nakamura, Tama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,806

(22) Filed: Jul. 9, 2019

(65) Prior Publication Data

US 2019/0335064 A1    Oct. 31, 2019

Related U.S. Application Data

(63) Continuation of application No. 14/934,901, filed on Nov. 6, 2015, now Pat. No. 10,432,824.

(30) Foreign Application Priority Data

Dec. 1, 2014   (JP) ................. 2014-243386

(51) Int. Cl.
*H04N 1/60*         (2006.01)
*H04N 1/00*         (2006.01)

(52) U.S. Cl.
CPC ....... *H04N 1/6027* (2013.01); *H04N 1/00015* (2013.01); *H04N 1/00023* (2013.01);
(Continued)

(58) Field of Classification Search
None
See application file for complete search history.

(56) References Cited

U.S. PATENT DOCUMENTS

| | | | | |
|---|---|---|---|---|
| 2008/0226316 | A1‡ | 9/2008 | Koshimura | G03G 15/5041 399/49 |
| 2011/0222079 | A1‡ | 9/2011 | Bezenek | G06K 15/00 358/1.8 |
| 2013/0301067 | A1‡ | 11/2013 | Nakamura | H04N 1/00037 358/1.13 |

FOREIGN PATENT DOCUMENTS

| | | | |
|---|---|---|---|
| JP | 2000-241248 A | | 9/2000 |
| JP | 2007-030340 | ‡ | 2/2007 |

(Continued)

*Primary Examiner* — Lennin R Rodriguezgonzalez
(74) *Attorney, Agent, or Firm* — Squire Patton Boggs (US) LLP

(57) ABSTRACT

An image forming apparatus that includes an image forming unit that forms an image on a transfer medium, a conveying unit that conveys the transfer medium, a first image detection unit that detects the image formed by the image forming unit on the transfer medium; and a control unit that controls the forming of the image and the conveying of the transfer medium, and receives detection results from the first image detection unit and a second image detection unit, wherein the control unit determines whether the image detected by the first image detection unit has image quality higher than or equal to predetermined quality and calibrates the first image detection unit based on the detection result from the first image detection unit and the detection result from the second image detection unit for the image having the image quality higher than or equal to predetermined quality.

12 Claims, 21 Drawing Sheets

(52) U.S. Cl.
CPC ..... *H04N 1/00045* (2013.01); *H04N 1/00058* (2013.01); *H04N 1/6033* (2013.01)

(56) References Cited

FOREIGN PATENT DOCUMENTS

| | | |
|---|---|---|
| JP | 2007-030340 A | 2/2007 |
| JP | 2010-064422 A | 3/2010 |
| JP | 2013-120170 A | 6/2013 |
| JP | 2013-207616 A | 10/2013 |
| JP | 2014-116676 A | 6/2014 |

‡ imported from a related application

IMAGE FORMING APPARATUS, IMAGE FORMING SYSTEM, METHOD OF CALIBRATING IMAGE DETECTION UNIT, AND POST-PROCESSING APPARATUS

CROSS-REFERENCE TO RELATED APPLICATIONS

This application is a continuation of U.S. patent application Ser. No. 14/934,901, filed on Nov. 6, 2016, which claims priority to and the benefit of Japanese Patent Application No. 2014243386, filed on Dec. 1, 2014, all of which are incorporated herein by reference in their entirety.

BACKGROUND OF THE INVENTION

Field of the Invention

The present invention relates to an image forming apparatus, an image forming system, a method of calibrating an image detection unit, and a post-processing apparatus for detecting an image formed on a transfer medium.

Description of the Related Art

In an image forming apparatus such as a copying machine, a fax machine, a printer, and a multifunction printer, an image is formed on a transfer paper by an image forming unit based on image data. Such an image forming process is performed according to an image forming condition (position, color, density and the like for the image forming) based on the image data. As the image forming apparatus is operated, the image forming condition can change temporarily or gradually, so quality is maintained through various kinds of an automatic adjustment function and the like.

For example, a patch image or the like is formed on a transfer paper at intervals of predetermined time of the operation of the image forming apparatus or predetermined number of printed sheets. The patch image is read by a line sensor or the like, and then the state of the image and the image forming condition are compared to determine if the image is formed properly. If the image is not properly formed according to the image forming condition and there is misalignment, calibration or the like is made on the image forming condition to maintain the quality of the image.

For example, in Japanese Patent Laid-Open No. 2007-30340, an image is read by a sensor apparatus including a colorimeter or a densitometer, and then density of a toner image formed by an image forming unit is adjusted according to the read result. Further, in Japanese Patent Laid-Open No. 2007-30340, if there is a stain on a part of the patch, a patch image is formed and read for an area excluding the area with the stain so as to be able to adjust output density.

For reading of an image, a line sensor using a CCD or a CIS as an image capturing element is widely used. The line sensor is suitable for high-speed reading and can read a fixed transfer paper at conveying speed of a fixing part, and then inspection can be made for color reproducibility, print positioning and the like. However, the line sensor is not suitable for color reproducibility, and therefore it is preferable that the line sensor is subject to periodic calibration using a spectral colorimeter for which colorimetric accuracy is ensured.

However, when calibration of the line sensor is performed with a spectral colorimeter in a configuration where the spectral colorimeter and the line sensor are provided on the same conveying path, a patch on the same chart needs be read. The spectral colorimeter can only measure a color as an average value in a spot area of a patch on the chart, and cannot determine if the patch is properly printed. The problem is that the spectral colorimeter cannot accurately measure colors of a patch when there is uneven density, a stain, a scratch or the like on the chart and therefore cannot properly perform calibration of the line sensor.

The present invention is made in view of the background above. One object of the present invention is to read an image and checks whether there is uneven density, a stain, a scratch and the like in order to determine print quality by a first image detection unit, and read by a second image detection unit the image determined as its printing quality being OK in order to calibrate the first image detection unit.

SUMMARY OF THE INVENTION

To achieve at least one of the abovementioned objects, an image forming apparatus reflecting one aspect of the present invention comprises an image forming unit that forms an image on a transfer medium, a conveying unit that conveys the transfer medium through a conveying path, a first image detection unit that detects the image formed by the image forming unit on the transfer medium conveyed by the conveying unit, a second image detection unit that detects the image formed by the image forming unit on the transfer medium conveyed by the conveying unit, and is different from the first image detection unit, and a control unit that controls the forming of the image and the conveying of the transfer medium, and receives detection results from the first image detection unit and the second image detection unit. The control unit has a detection-unit calibration mode for calibrating the first image detection unit with use of the detection result of the image from the second image detection unit. The control unit determines, on the detection-unit calibration mode, whether the image detected by the first image detection unit has image quality higher than or equal to predetermined quality, and the control unit calibrates the first image detection unit based on the detection result from the first image detection unit and the detection result from the second image detection unit for the image having the image quality higher than or equal to predetermined quality.

In the image forming apparatus according to the abovementioned aspect, it is preferable that further comprises the second image detection unit that detects the image formed by the image forming unit on the transfer medium conveyed by the conveying unit.

In the image forming apparatus according to the abovementioned aspect, it is preferable that the control unit receives a detection result from the second image detection unit that is equipped in another apparatus and that detects an image of the transfer medium.

In the image forming apparatus according to the abovementioned aspect, it is preferable that the second image detection unit detects an image on the transfer medium on which the image is formed by the image forming unit and which is conveyed by the conveying unit.

In the image forming apparatus according to the abovementioned aspect, it is preferable that the control unit determines whether an image detected by the first image detection unit has image quality higher than or equal to predetermined quality based on the entire image or a part of the image having been read.

In the image forming apparatus according to the abovementioned aspect, it is preferable that, when the image detected by the first image detection unit does not have image quality higher than or equal to the predetermined quality, the control unit determines which of the first image detection unit and the transfer medium has caused the result that the image does not have image quality higher than or equal to the predetermined quality, and, when the first image detection unit has caused the result, the control unit uses the detection result of the image from the second image detection unit.

In the image forming apparatus according to the abovementioned aspect, it is preferable that the control unit determines whether the detection result detected by the first image detection unit can be processed to be usable for the calibration when the image detected by the first image detection unit does not have image quality higher than or equal to the predetermined quality.

In the image forming apparatus according to the abovementioned aspect, it is preferable that the control unit determines whether the calibration for the first image detection unit can be achieved at accuracy higher than or equal to predetermined accuracy when only a part of the image detected by the first image detection unit is used, the part having the image quality higher than or equal to the predetermined quality.

In the image forming apparatus according to the abovementioned aspect, it is preferable that, when the image detected by the first image detection unit has a defective area that does not have image quality higher than or equal to the predetermined quality, the control unit uses the detection result of the image from the second image detection unit based on a part of the image excluding the defective area.

In the image forming apparatus according to the abovementioned aspect, it is preferable that the control unit detects a position of an image based on the detection result from the first image detection unit and uses the detection result of the image from the second image detection unit at the detected position of the image.

In the image forming apparatus according to the abovementioned aspect, it is preferable that the control unit perform control so that based on a position of the image, the second image detection unit or the transfer medium or both of them are moved for the detection of the image.

In the image forming apparatus according to the abovementioned aspect, it is preferable that the control unit calculates a calibration value for the first image detection unit using the detection result from the second image detection unit, for the image detected by the first image detection unit and the second image detection unit, when the image detected by the first image detection unit has image quality higher than or equal to the predetermined quality.

In the image forming apparatus according to the abovementioned aspect, it is preferable that the control unit determines whether each patch image is usable or not when a plurality of patch images are formed on the transfer medium and only a part of the image is used for the detection of the image.

In the image forming apparatus according to the abovementioned aspect, it is preferable that the control unit forms a plurality of patch images having the same density and uses the detection result from the second image detection unit only for those patch images whose images detected by the first image detection unit have the image quality higher than or equal to the predetermined quality among the patch images having the same density.

In the image forming apparatus according to the abovementioned aspect, it is preferable that the image forming apparatus includes a reverse path that receives the transfer medium and reverses the front and the back of the transfer medium at the downstream side of the image forming unit, and returns back the transfer medium at an upper stream side of the image forming unit. When at least the image detected by the first image detection unit does not have image quality higher than or equal to the predetermined quality, the control unit detects an image formed on the back side at the first image detection unit and the second image detection unit, and determines whether the image detected by the first image detection unit has image quality higher than or equal to the predetermined quality, and the control unit performs calibration of the first image detection unit for the image having the image quality higher than or equal to the predetermined quality, based on the detection result from the first image detection unit and the detection result from the second image detection unit.

In the image forming apparatus according to the abovementioned aspect, it is preferable that, after the calibration of the first image detection unit, the control unit determines validity of the calibration result by reading the image on the transfer medium with the first image detection unit and the second image detection unit.

In the image forming apparatus according to the abovementioned aspect, it is preferable that the first image detection unit is a line sensor.

In the image forming apparatus according to the abovementioned aspect, it is preferable that the second image detection unit is a spectral colorimeter To achieve at least one of the abovementioned objects, an image forming system reflecting one aspect of the present invention comprises a control unit that receives detection results from a first image detection unit that detects an image on a transfer medium and a second image detection unit that detects the image of the transfer medium and is different from the first image detection unit, wherein the control unit has a detection-unit calibration mode for calibrating the first image detection unit with use of the detection result of the image from the second image detection unit; the control unit determines, on the detection-unit calibration mode, whether the image detected by the first image detection unit has image quality higher than or equal to predetermined quality, and the control unit performs control processes for calibrating, when the image quality is higher than or equal to the predetermined quality, the first image detection unit based on the detection result from the first image detection unit and the detection result from the second image detection unit for the image having the image quality higher than or equal to the predetermined quality.

To achieve at least one of the abovementioned objects, a method of calibrating an image detection unit reflecting one aspect of the present invention comprises a reception step for receiving detection results of an image on a transfer medium being conveyed detected by a first image detection unit and a second image detection unit, and a calibration step for determining whether an image detected by the first image detection unit has image quality higher than or equal to predetermined quality and calibrating, when the image quality is higher than or equal to the predetermined quality, the first image detection unit based on the detection result from the first image detection unit and the detection result from the second image detection unit.

In the method of calibrating an image detection unit according to the abovementioned aspect, it is preferable that the method includes a first image detection step for detecting the image on the conveyed transfer medium with the first image detection unit, and a second image detection step for detecting the image on the conveyed transfer medium with the second image detection unit.

To achieve at least one of the abovementioned objects, a post-processing apparatus reflecting one aspect of the present invention comprises a conveying unit that conveys a transfer medium on which an image is formed through a conveying path a second image detection unit that detects the image on the transfer medium being conveyed by the conveying unit, which is different from a first image detection unit, a control unit that receives detections results from the first image detection unit and the second image detection unit, wherein the control unit determines whether the image detected by the first image detection unit has image quality higher than or equal to predetermined quality, and the control unit performs control processes for calibrating, when the image quality is higher than or equal to the predetermined quality, the first image detection unit based on the detection result from the first image detection unit and the detection result from the second image detection unit for the image having the image quality higher than or equal to the predetermined quality.

DETAILED DESCRIPTION OF THE PREFERRED EMBODIMENTS

Embodiments of the present invention are described below.

Figure 1:
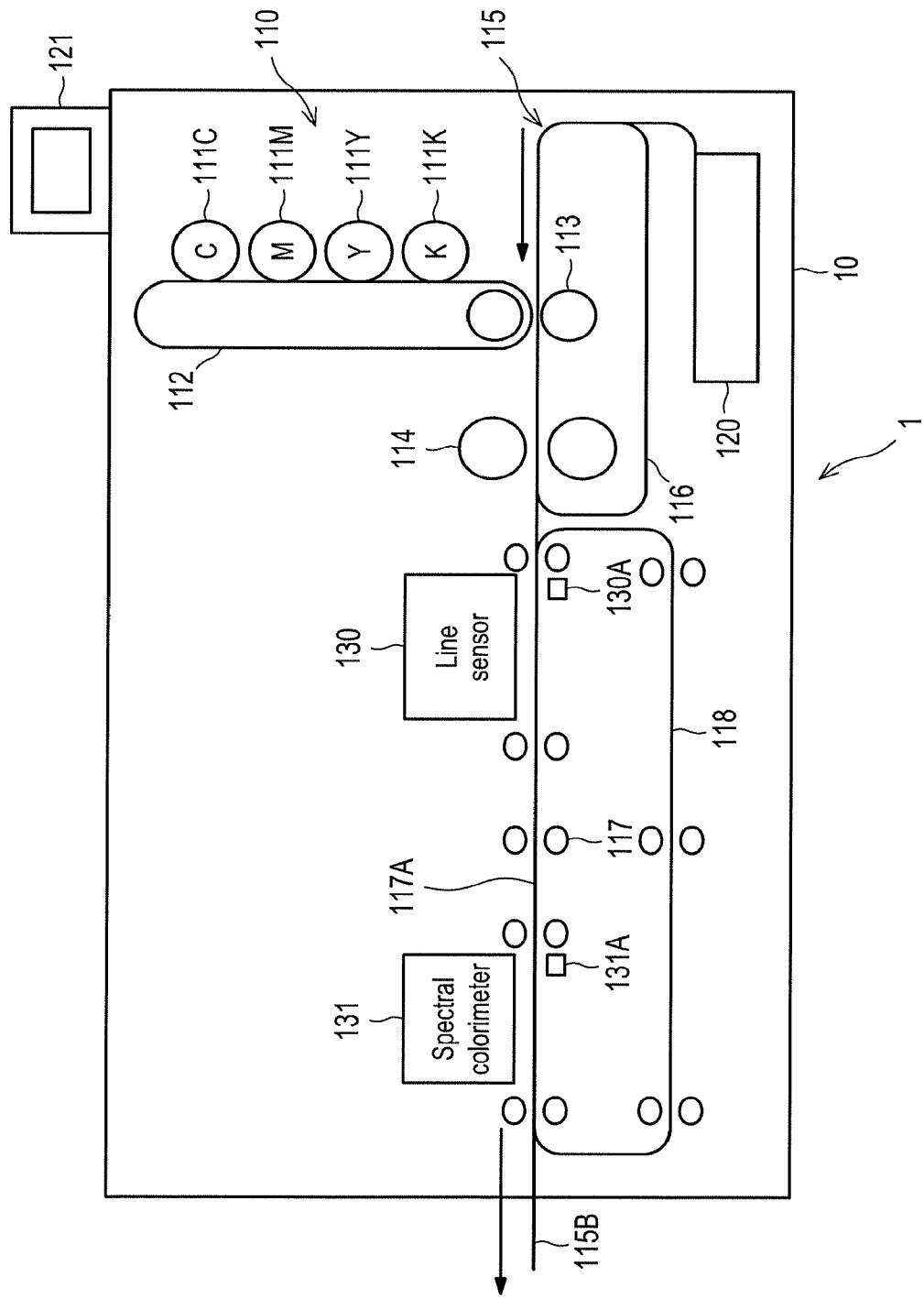
FIG. 1 shows a mechanical scheme of an image forming system according to an embodiment of the present invention.

FIG. 1 shows an image forming system 1. The image forming system 1 can be consisted of only an image forming apparatus 10 or can be consisted of an image forming apparatus 10 being connected to other apparatuses.

The image forming apparatus 10 includes an image forming unit 110 that forms an image on a transfer paper. The image forming unit 110 has photoreceptors 111C, 111M, 111Y, and 111K (collectively referred to as photoreceptors 111 hereinafter) represented for each color (cyan, magenta, yellow, black, and the like). At circumferences of each photoreceptor 111C, 111M, 111Y and 111K, a development unit and a writing unit (not shown) including a charger and LD for each color are provided. On the surface of the photoreceptor 111 charged by the charger, image exposure is carried out by the writing unit based on image information of draft data recorded in an image memory and the like. A latent image is thus formed on the surface of the photoreceptor 111. The latent image is developed by the development unit to be a toner image. The toner image is transferred on a middle transfer belt 112, and then transferred from the middle transfer belt 112 to a transfer paper conveyed by a secondary transfer roller 113 along a conveying path 115. The conveying path 115 is extended toward a paper discharging path 115B outside the apparatus.

The transfer paper on which the image is transferred is fixed with heating by a fixing device 114 and conveyed through the conveying path 115. An image forming apparatus of the present invention can be applied to a monochrome machine and can be use other special colors (e.g., clear color) other than the colors described above.

A reverse conveying path 116 is diverged from a downstream side of the fixing device 114 of the conveying path 115 to reverse the transfer paper on which an image is formed and circulate the transfer paper back to an upper stream side of the image forming unit 110.

The image forming apparatus 10 includes, at the lower part thereof, a paper feeding tray 120 that stores sheets of transfer paper. The conveying path 115 leads from the paper feeding tray 120 to the image forming unit 110, and then from the image forming unit 110 to the paper discharging path 115B. The transfer paper corresponds to the transfer medium of the present invention. The transfer medium is not limited to paper and can be other mediums such as OHP and cloth.

A transfer paper stored in the paper feeding tray 120 is forwarded to the conveying path 115 and conveyed to the secondary transfer roller 113. At the secondary transfer roller 113, a color image or a monochrome image on the middle transfer belt 112 is transferred on the transfer paper. On the transfer paper on which the image is transferred, a toner image thereon is fixed by adding heat and pressure at the fixing device 114.

Further, a line sensor 130 that reads an image on the upper surface of the transfer paper is provided at the upper side of the conveying path 115 and at the downstream side of the point where the reverse conveying path 116 is diverged from the conveying path 115. The line sensor 130 can adopt imaging elements such as CCD and CIS, and it is preferable that the line sensor 130 is configured to have longer length than the width of transfer paper conveyed along the conveying path 115. The line sensor 130 corresponds to a first detection unit of the present invention. The first image detection unit is not limited to a particular type as long as an image on the transfer paper can be detected. Further, the first detection unit can be configured to read an image by a surface level or by integration of a dot level. Further, a line-sensor transfer paper detection sensor 130A is provided at the starting position for the line sensor 130 to read an image on the conveying path 115. The line-sensor transfer paper detection sensor 130A can use an optical sensor and the like to detect a paper.

A spectral colorimeter 131 is provided on the conveying path 115 at the downstream side of the line sensor 130 to read colors of the image on the transfer paper conveyed through the conveying path 115. The spectral colorimeter 131 emits illuminating light onto the transfer paper and receives light with a sensor reflected on the image of the transfer paper. The spectral colorimeter 131 quantifies colors with numbers by dispersing received light and expressing components of the light. The spectral colorimeter 131 corresponds to a second image detection unit of the present invention. A colorimetry-object bearing transfer paper detection sensor 131A is provided at the starting position for the spectral colorimeter 131 to read an image on the conveying path 115. The colorimetry-object bearing transfer paper detection sensor 131A can use an optical sensor and the like to detect a paper.

A colorimetry object conveying roller 117 is provided at the downstream side of the line sensor 130 and the upper stream side of the spectral colorimeter 131. The colorimetry object conveying roller 117 can lower conveying speed at which the transfer paper is conveyed to the downstream side, and the conveying path past the colorimetry object conveying roller 117 is the colorimetry object conveying path 117A.

Further, at the downstream side of the spectral colorimeter 131, a circulating path 118 is diverged before the paper discharging path 115B. The other end of the circulating path 118 is converged into the conveying path 115 at the upper stream side of the line sensor 130. The conveying path 115 can switch to the path leading to the paper discharging path 115B or to the path leading to the circulating path 118. When the transfer paper is conveyed to the circulating path 118, the transfer paper is returned back to the conveying path 115 again, and an image can be detected by the line sensor 130 and the spectral colorimeter 131.

In this embodiment, the line sensor 130 is used as the first image detection unit, and the spectral colorimeter 131 is used as the second image detection unit, but types of the first image detection unit and the second image detection unit are not limited to these configuration. For example, when the first image detection unit lacks a specific detection feature, the second image detection unit can be realized with a unit having superior detection function as to this detection feature.

Further, an operation unit 121 is provided at the upper side of the image forming apparatus 10 to display information and accept user operations. The unit for operation and the unit for display can be separately provided.

Figure 2:
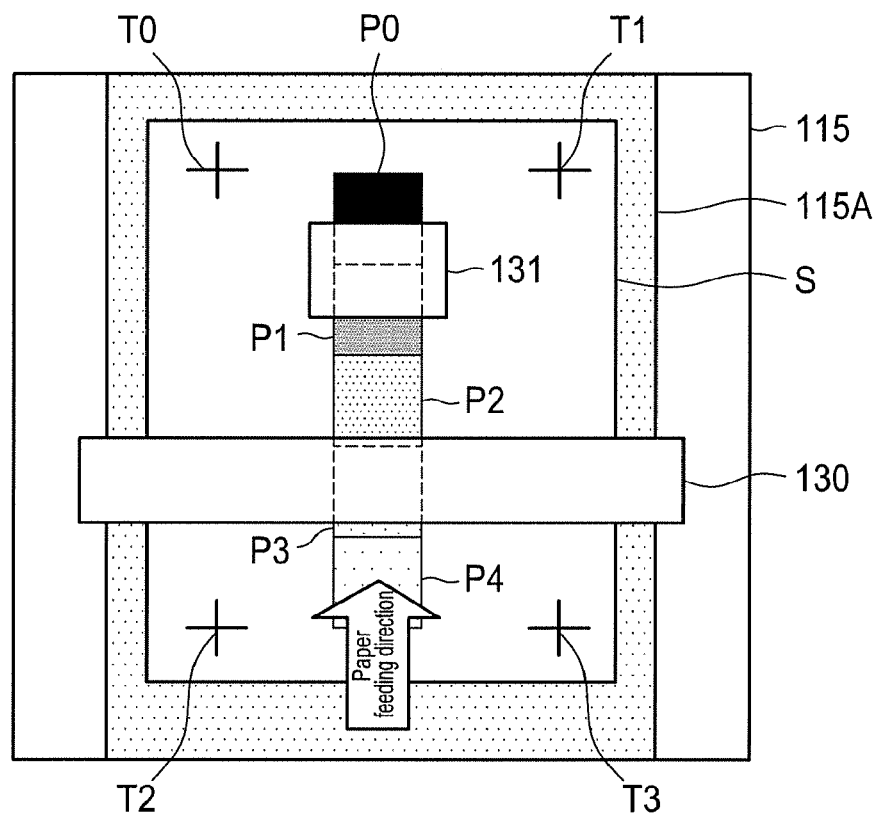
FIG. 2 shows a plan view illustrating an arrangement relation of a first image detection unit and a second image detection unit thereof.

FIG. 2 shows a plan view of an arrangement state of the line sensor 130 and the spectral colorimeter 131. Crop marks T0 to T3 and patches P1 to P4 are formed on a transfer paper S. A background board 115A is positioned on the conveying path 115. The area measured by the spectral colorimeter 131 is limited compared to that of the line sensor 130. Therefore, it is preferable that the patch image is formed along the position of the main scanning direction of the spectral colorimeter 131.

Further, the image forming system 1 includes a control unit 100. The control unit 100 includes a CPU, a program for operating the CPU, a ROM for storing the program, a RAM for workspace or the like, and a nonvolatile memory for storing operation parameters and the like. The control unit 100 controls the entire image forming system and receives reading results from the image forming unit 110, the conveying path 115, the line sensor 130, and the spectral colorimeter 131. The control unit of the present invention is not limited to be equipped in the image forming apparatus 10 but can be equipped in a server or a post-processing apparatus.

In this embodiment, the description above illustrates a case where the image forming apparatus 10 includes the first image detection unit and the second image detection unit therein. However, the image forming apparatus 10 can include only the first image detection unit and a post-processing apparatus can include the second image detection unit. Further, the image forming apparatus may not include the first image detection unit and the second image detection unit, and the post-processing apparatus can include both the first image detection unit and the second image detection unit. Further, the first image detection unit and the second image detection unit can be included in different post-processing apparatuses. When the post-processing apparatus includes the first image detection unit or both the first image detection unit and the second image detection unit, each apparatus can be connected online or can be at the offline state. In case of the offline state, data can be prepared in a manner such that control contents for calibration can be displayed in the post-processing apparatus, and control contents can be stored in a removable storage unit and then the data for calibration contents can be transferred to the apparatus to which calibration needs to be made. These operations are included for the control processes for calibration.

Figure 3:
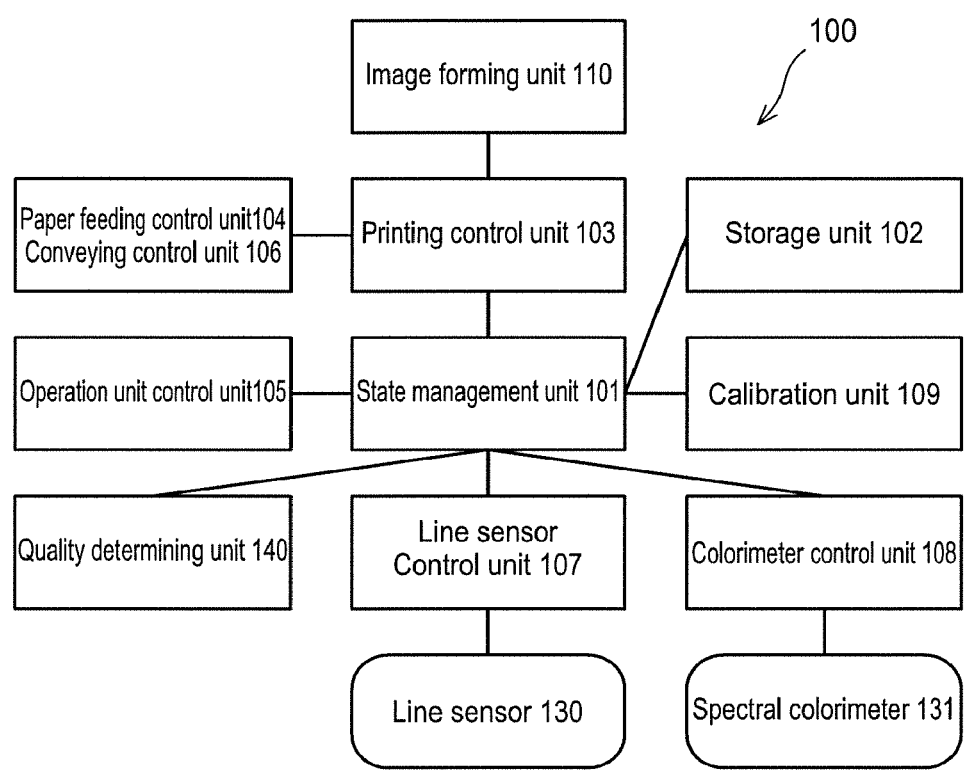
FIG. 3 shows a function block diagram of a control unit thereof.

FIG. 3 shows a function diagram of the control unit 100 and other peripherals.

A state management unit 101 controls the entire image forming system 1 and manages states of the entire image forming system 1. A storage unit 102 is connected to the state management unit 101. The storage unit 102 includes a ROM for storing a program or the like therein, a RAM for workspace, and a nonvolatile memory such as flash memory and HDD for storing data in a nonvolatile way. The nonvolatile memory stores operation parameters of the image forming system, a threshold value for making a determination process on quality of the image read, an image forming calibration condition for calibrating the image, a detection-unit calibration condition for calibrating an image detection unit, and patch image data and the like in a readable and writable state.

A printing control unit 103 is connected to the state management unit 101. An image forming unit 110 is connected to the printing control unit 103 in a manner such that the image forming unit can be controlled. The printing control unit 103 controls the image forming unit 110 to form an image on a transfer paper.

A paper feeding control unit 104 is connected to the state management unit 101. The paper feeding control unit 104 controls the paper feeding tray 120 to feed a transfer paper to the conveying path 115. Further, a conveying control unit 106 is connected to the state management unit 101. The conveying control unit 106 controls the conveying unit for conveying the transfer paper fed from the paper feeding tray 120. The conveying unit is configured with the conveying path 115, the reverse conveying path 116, a conveying roller on the conveying path, a colorimetry object conveying roller 117 that is described below, and a motor for driving these.

A line sensor control unit 107 is connected to the state management unit 101. The line sensor control unit 107 controls operations of the line sensor 130, and receives image data on the transfer paper that is read by the line sensor 130, and then sends the image data to the state management unit 101.

A colorimeter control unit 108 is connected to the state management unit 101 in a manner such that the colorimeter control unit 108 can be controlled. The colorimeter control unit 108 controls operations of the spectral colorimeter 131 and obtains a result of reading an image at the spectral colorimeter 131, and then sends the result to the state management unit 101.

A calibration unit 109 is connected to the state management unit 101 in a manner such that the calibration unit 109 can be controlled. The calibration unit 109 receives from the state management unit 101 the result of reading the image at the line sensor 130 and the result of reading the draft at the spectral colorimeter 131.

On an image forming calibration mode, the calibration unit 109 obtains the image reading result at the line sensor 130, compares the reading result with image forming conditions, and performs calibrations by amending image forming if needed. At this process, when the line sensor 130 has been calibrated based on the reading result from the spectral colorimeter 131, the calibrated result is used.

Further, on a detection-unit calibration mode, the calibration unit 109 obtains the reading results on the same image on the same transfer paper from the line sensor 130 and the spectral colorimeter 131 and then calibrates the line sensor 130 as to color reproducibility if needed.

Further, a quality determining unit 140 is connected to the state management unit 101 in a manner such that the quality determining unit 140 can be controlled. The quality determining unit 140 obtains the image read by the line sensor 130 and then detects positions of the image and performs a determining process on quality of the image read. Based on the determination on the image quality, the quality determining unit 140 can determine whether the image has predetermined quality. The levels for the predetermined quality are stored in the storage unit 102.

In the function blocks of FIG. 3, the control unit 100 includes blocks per each function except the image forming unit 110, the line sensor 130, and the spectral colorimeter 131.

The following describes basic operations of the image forming apparatus 10.

When a user performs an operation for starting printing in the image forming apparatus 10 via the operation unit 121 or external devices, image data is obtained from a draft reading unit or the like (not shown). When calibration of the image forming or calibration of the detection unit starts, data of the patch image is obtained from the storage unit 102.

Based on the generated image data, the image forming unit 110 forms, via controls of the printing control unit 103, an electrostatic latent image on the surface of the photoreceptor 111 where image exposure means are evenly charged. The formed electrostatic latent image is developed into a toner image by a development unit. Then, the toner image formed on the surface of the photoreceptor 111 is transferred on a middle transfer belt 112 (first transfer). The way of obtaining image data is not limited to the description above and the image data can be obtained via network.

Upon the operation for starting printing, the transfer paper, which is stacked and stored in the paper feeding tray 120, is forwarded (fed) to the conveying path 115 one by one via the control by the paper feeding control unit 104. The transfer paper is then conveyed through the conveying path 115 via the control by the conveying control unit 106. The transfer paper is conveyed to the contact position with the secondary transfer roller 113 in synchronization with the toner image on the middle transfer belt 112.

At the position of the secondary transfer roller 113, the toner image on the middle transfer belt 112 is transferred on the transfer paper (secondary transfer). In this secondary transfer, high positive transfer voltage is applied to the secondary transfer roller 113 to attract the negatively charged toner image from the middle transfer belt 112 onto the transfer paper in an electrostatic manner to process the transfer. The toner image that is transferred on the transfer paper is positioned at the upper surface side along the conveying path 115 and then fixed onto the transfer paper S through heating and melting at the fixing device 114. After that, in case of a single-side printing mode, the transfer paper is ejected to the downstream side.

On a double-side printing mode, the conveying path is switched, and the transfer paper on which the image is formed is conveyed from the conveying path 115 to the reverse conveying path 116, where the front and the back of the transfer paper are reversed and the transfer paper is circulated to the conveying path 115 of the upper stream side of the secondary transfer roller 113. The transfer paper S that is circulated to the conveying path 115 has its front and back reversed, and therefore, in the same manner as above, the image transferred on the middle transfer belt 112 is transferred onto the back surface side of the image by the secondary transfer roller 113. After that, the image is fixed at the transfer paper by the fixing device 114 and then conveyed to the downstream side.

On the image forming calibration mode or the detection-unit calibration mode, the image on the transfer paper conveyed on the conveying path 115 is read by the line sensor 130. At this process, the line sensor 130 is operated through the control by the line sensor control unit 107 to read the image on the transfer paper being conveyed along the conveying path 115. The image read is sent to the control unit 100 and used for the calibration for the image forming or the calibration for the line sensor 130.

When the image is read by the spectral colorimeter 131 at the downstream side of the line sensor 130, the conveying control unit 106 can control the colorimetry object conveying roller 117 to adjust the conveying speed of the transfer paper lower than the normal conveying speed in image forming. The conveying speed can be configured in a manner such that an operator can set the conveying speed through the operation unit 121. As described above, the storage unit 102 can store the transfer paper conveying speed after changed or the normal transfer paper conveying speed.

The colorimeter control unit 108 controls the operation of the spectral colorimeter 131 to read the image on the transfer paper being conveyed along the conveying path 115. The reading result is sent to the control unit 100 and used for the calibration of the line sensor 130.

Operation timings for the image forming calibration or the detection-unit calibration can be previously set according to the operation time of the apparatus or the number of printing sheets in a manner such that the calibrations are automatically executed at the previously set timings. Further, there can be configuration where the operator can provide an instruction to execute the calibrations via the operation unit 121.

Figure 4:
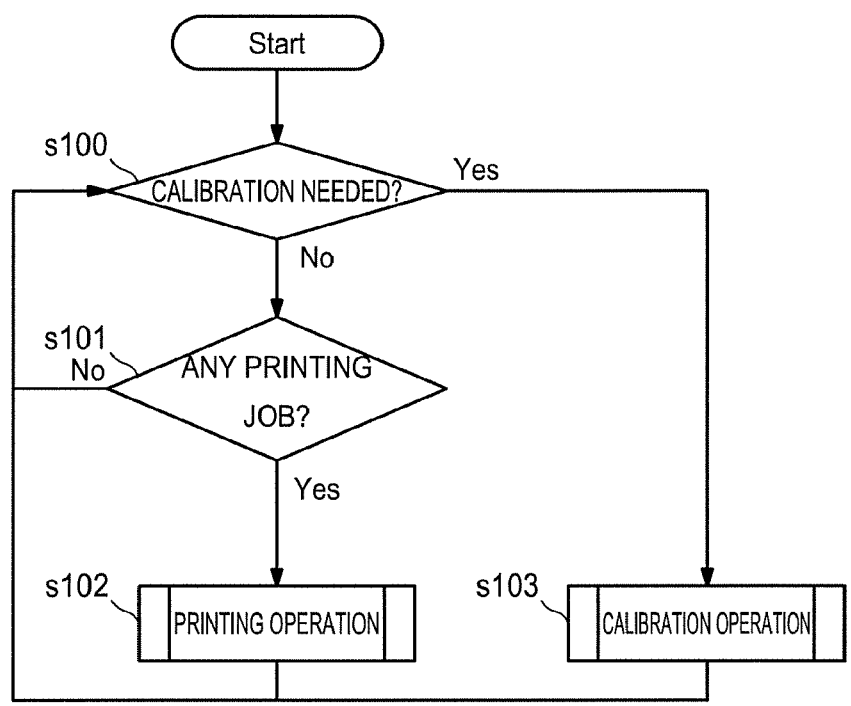
FIG. 4 shows a flowchart of an overall scheme of printing and calibration processes thereof.

The following describes the overall procedure including the printing operation and the detection-unit calibration with reference to the flowchart shown in FIG. 4. The following procedure is performed under the control by the control unit 100.

s100: Detection Calibration?

The process is started, and it is determined whether the condition for detection calibration is met (Step s100). Whether detection calibration is needed or not can be determined according to predetermined conditions.

The detection calibration is, for example, performed based on the conditions shown in Table 1. The settings No. 1 and 2 are conditions set by a user via the operation unit while the settings No. 3 and 4 are conditions occurring when the state of the apparatus changes, for example, after maintenance on parts. It can be determined that the condition for detection calibration is met when any of the above conditions is met, or a user can set any specific condition from the multiple conditions via the operation unit 121.

TABLE 1

Conditions for starting calibration

| Setting No. | Condition | Condition Type |
| --- | --- | --- |
| 1 | Number of printed sheets after the completion of the previous line sensor calibration >1000 | User Setting |
| 2 | Past time after the completion of the previous line sensor calibration >30 minutes | User Setting |
| 3 | Initial operation after line sensor maintenance | Machine Setting |
| 4 | Initial operation after spectral colorimeter maintenance | Machine Setting | s101: Any Printing Job?

When the detection calibration condition is not met (Step s100, No), the state management unit 101 checks if there is a job by receiving printing jobs (Step s101). When receiving printing jobs and there is a printing job (Step s101, Yes), a printing request is sent to the printing control unit 103. When there is no printing job (Step s101, No), the procedure returns to Step s100.

s102: Printing Operation

When the printing request is made at Step s101, the state management unit 101 sets the operation mode at the normal mode according to the printing request, and then the printing control unit 103 performs printing based on the printing job at Step s102. The procedure for the printing is described later below in detail.

s103: Calibration Operation

When the detection calibration condition is met (Step s100, Yes), a detection-unit calibration request is sent to the calibration unit 109.

At Step s103, the state management unit 101 receives the detection-unit calibration request and sets the operation mode at the detection-unit calibration mode. The calibration unit 109 performs calibration processes on the line sensor. The procedure for the detection-unit calibration is described later below in detail.

Figure 5:
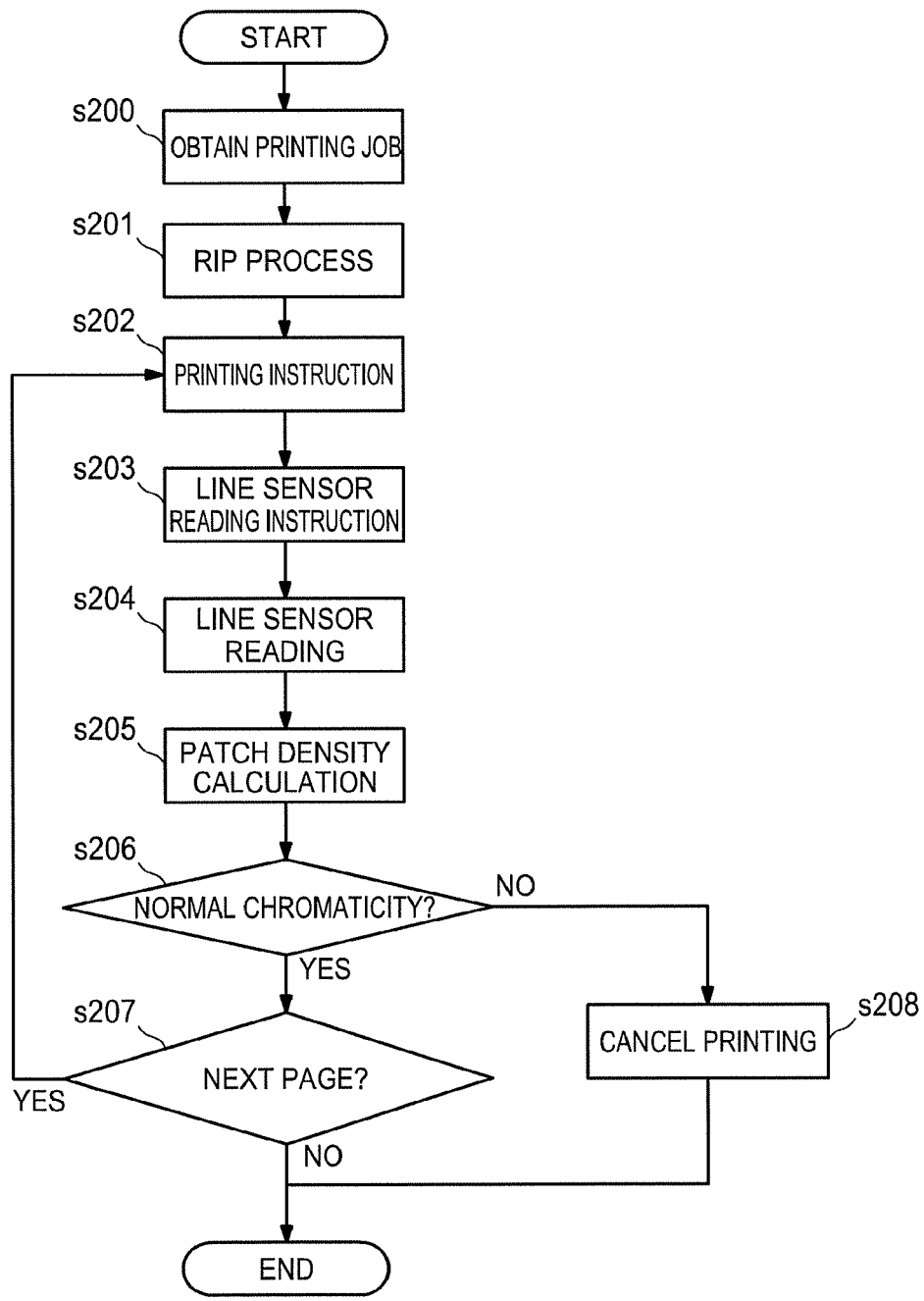
FIG. 5 shows a flowchart of procedure for a printing operation thereof.

The following describes procedure for printing with reference to the flowchart in FIG. 5. The following procedure is performed under the control by the control unit 100.

s200: Obtain Printing Job

Upon the start of the printing process, the printing control unit 103 receives a printing request and a printing job from the state management unit 101 (Step s200).

s201: RIP Process

Figure 11:
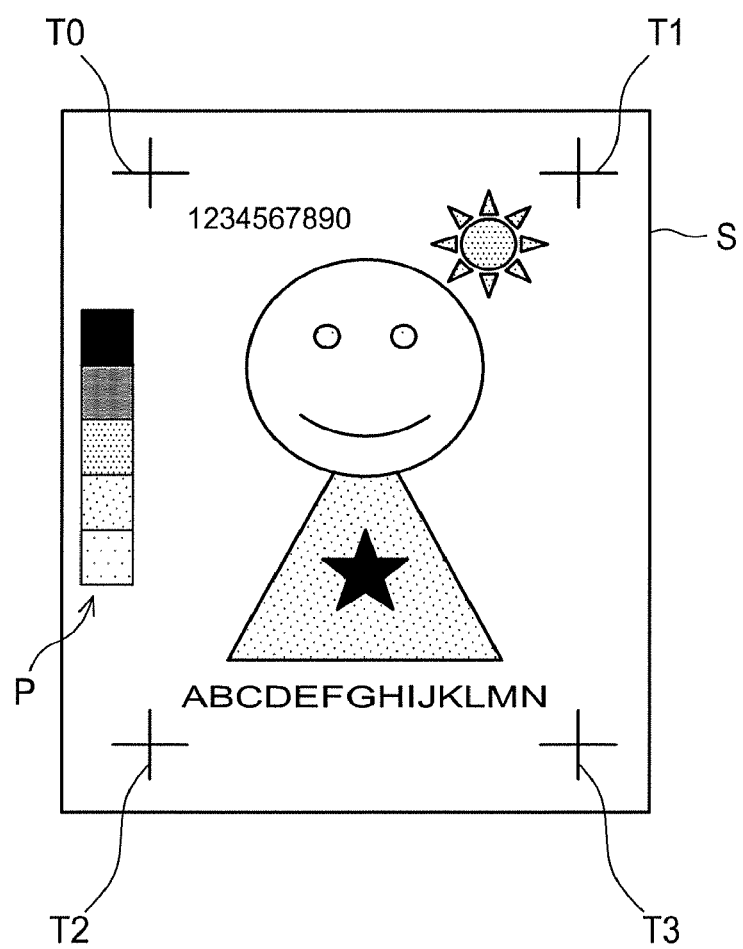
FIG. 11 shows a normal printing display used for detection-unit calibration thereof.

After obtaining the printing job, the printing control unit 103 performs a RIP process to create a RIP image based on a printing job information (Step s201). Further, a patch can be added to the RIP image for checking color reproducibility. In the RIP image illustrated in FIG. 11, a patch P is arranged at the left end outside of the cropping reference points indicated by four crop marks T0 to T3 on the transfer paper S. The patch P is formed having separate areas with different density. In order not to waste the transfer paper, it is preferable that the patch is applied at a part that is cropped out and thrown away after the fixing.

s202: Printing Instruction

After the RIP process, the printing control unit 103 instructs, as the printing instruction, the image forming unit 110 to form the RIP image on the transfer paper and also instructs the paper feeding control unit 104 to start feeding the transfer paper (Step s202). The image forming unit 110 controls laser, photoreceptors, the belt, a fixing part and the like to transfer the image on the transfer paper.

s203: Line Sensor Reading Instruction

After the printing instruction, the state management unit 101 sets the operation mode at the normal mode and instructs the line sensor control unit 107 to read the transfer paper with the line sensor 130 (Step s203).

s204: Line Sensor Reading

Based on the reading instruction, the line sensor control unit 107 reads the image on the transfer paper with the line sensor 130, and then sends the image read to the calibration unit 109 via the state management unit 101 (Step s204).

s205: Patch Density Calculation

The calibration unit 109 detects the patch from the image read from the transfer paper with the line sensor 130 and calculates the chromaticity of each patch (Step s205).

s206: Normal Chromaticity?

The calibration unit 109 determines whether the chromaticity is a normal value from the detection result of the patch (Step s206). The expected chromaticity, which is obvious from the image forming condition, is compared with the detection result so as to determine whether, for example, the difference in chromaticity is within a standard value ($\Delta E \leq 1.0$). The standard value can be stored in the storage unit 102 in a readable state or can be set by the user through the operation unit 121. If it is determined as abnormal (Step s206, No), the calibration unit 109 sends notification to the state management unit 101 about the abnormal chromaticity.

s207: Next Page?

If it is determined as normal at the determination on the chromaticity (Step s206, Yes), the printing control unit 103 refers to printing job information to check whether there is need for printing a next page, i.e., whether there is a next page (Step s207). If there is a next page (Step s207, Yes), the forming process of the RIP image of the next page is started (to Step s202). If there is no next page (Step s207, No), the job is closed.

s208: Cancel Printing

If the detected value is determined as abnormal by the calibration unit 109 (Step s206, No), the calibration unit 109 sends a notification to the state management unit 101 about the abnormal chromaticity and then the state management unit 101 cancels the printing (Step s209). After that, the job is closed.

Further, when the printing is cancelled, the state management unit 101 can display a notification about the detected abnormal chromaticity on the operation unit 121 for the user. Further, it is preferable that an image-forming unit calibration button or the like is displayed on the operation unit 121 so that the user can start the calibration in response to the instruction, or that calibration for the image forming unit is automatically performed upon detecting the abnormal chromaticity.

Figure 6:
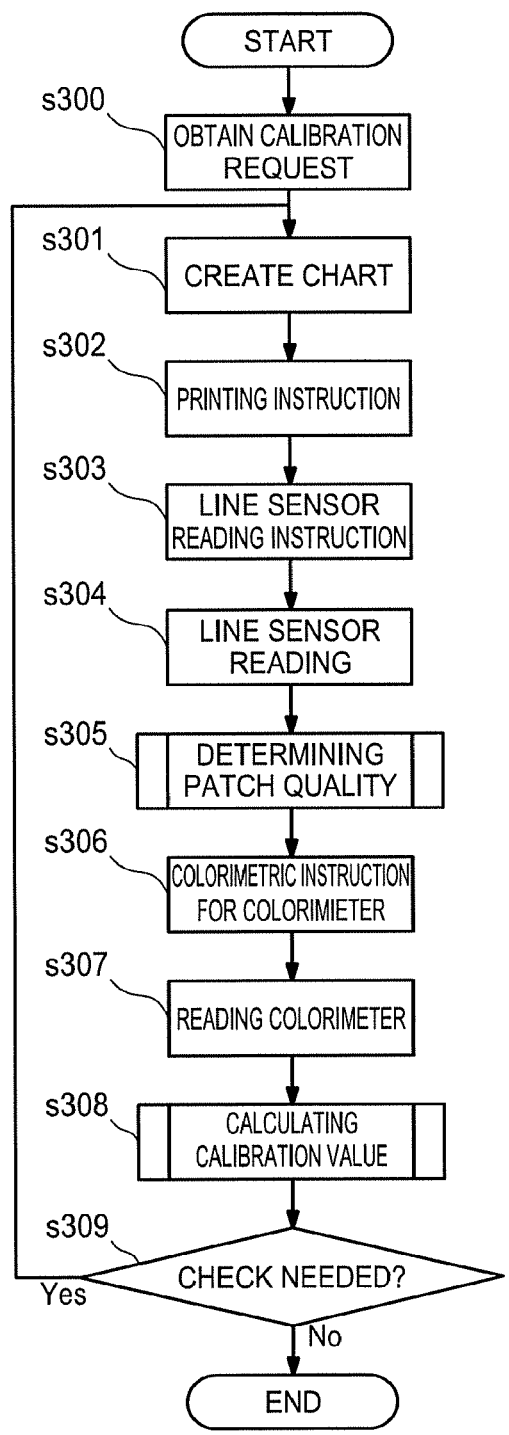
FIG. 6 shows a flowchart of procedure for a detection-unit calibration operation thereof.

The following describes procedure for the detection-unit calibration with reference to the flowchart shown in FIG. 6. The following procedure is performed under control by the control unit 100.

s300: Obtain Calibration Request

When the detection-unit calibration procedure starts, the calibration unit 109 receives a line sensor calibration request from the state management unit 101 (Step s300).

s301: Create Chart

After obtaining the calibration request (Step s300), the state management unit 101 sends detection-unit calibration chart information that is stored in the storage unit 102 to the printing control unit 103. The printing control unit 103 creates a chart image for the detection-unit calibration (Step s301).

Figure 12:
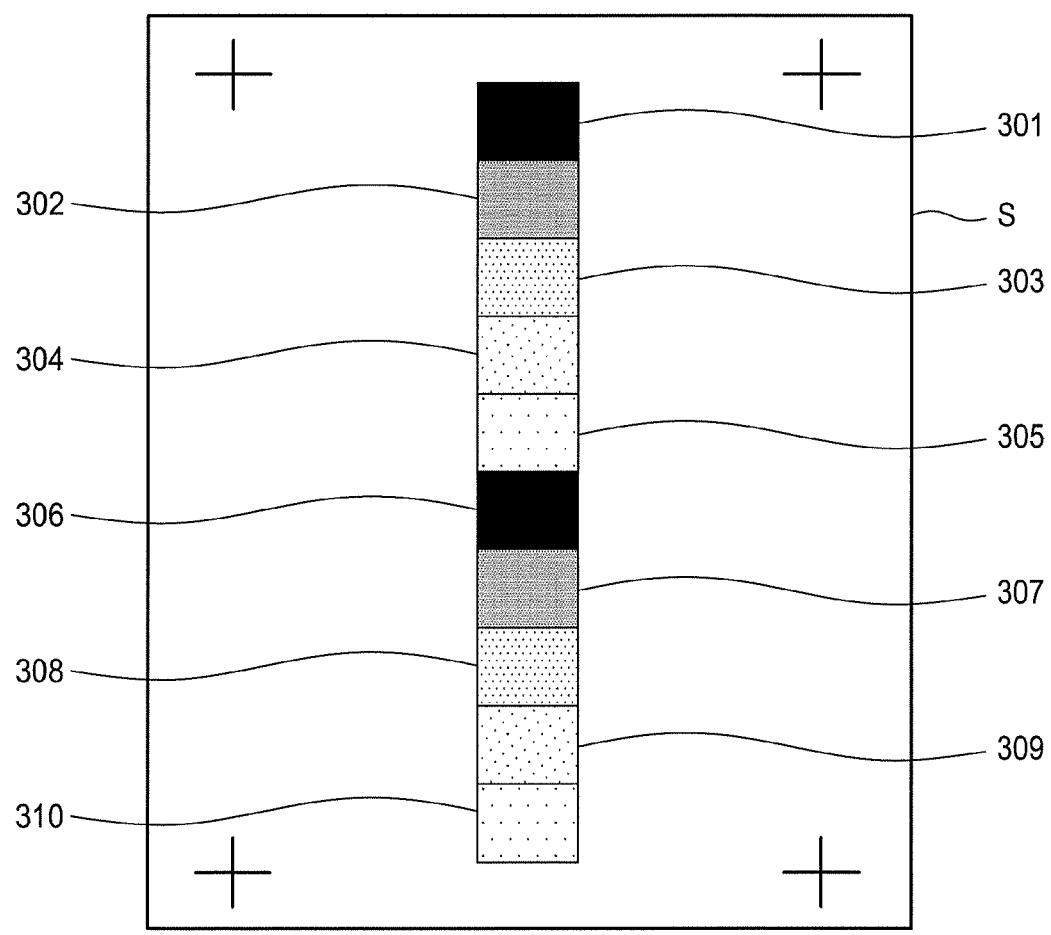
FIG. 12 shows a calibration chart display used for detection-unit calibration thereof.

Table 2 shows the detection-unit calibration chart information, which shows the records of the positions and sizes of the patches. The detection-unit calibration chart is illustrated in FIG. 12. As illustrated in the chart and figure, in the calibration chart information, patches 301 to 310 are formed on the transfer paper S in this order along the sub scanning direction, and there are a plurality of patches with the same density (301 and 306, 302 and 307, 303 and 308, 304 and 309, 305 and 310).

The present invention is not limited to use of the patch images, and normal images formed on the transfer paper can be used for the calibration chart without patch images.

based on the detection-unit calibration chart information (Step s303). At this process, the state management unit 101 sends a notification to the line sensor control unit 107 indicating that the operation mode is set at the detection-unit calibration mode. Further, the instruction is made to read the background board 115A on the conveying path 115 for the reading area bigger than the paper in order to determine the causes of the quality defect of the patch. This is because an area outside the paper is used by the quality determining unit 140 for quality determination described later below.

s304: Line Sensor Reading

In response to the line sensor reading instruction, the line sensor control unit 107 reads, via the line sensor 130, the image including the patch that is formed on the transfer paper by the image forming unit 110. Then, the transfer paper image is sent to the storage unit 102 via the state management unit 101 and is stored therein (Step s304).

s305: Determining Patch Quality

The quality determining unit 140 reads the transfer paper image from the storage unit 102 to determine printing quality of each patch. The flow of determining quality is described later below.

s306: Colorimetric Instruction for Colorimeter

The state management unit 101 refers to the storage unit 102 and instructs the colorimeter control unit 108 to read those patches that are determined as usable for calibration by the patch quality determining unit 140.

In case that the distance of the colorimetry object conveying path 117A between the line sensor 130 and the spectral colorimeter 131 is so short that the determination by the patch quality determining unit 140 is not made in time for the transfer paper passing through the spectral colorimeter 131, control is performed so that the transfer paper can be inserted to the circulating path 118 to pass through the spectral colorimeter 131 again. Further, the spectral colorimeter 131 can be arranged on the circulating path 118.

s307: Reading Colorimeter

The colorimeter control unit 108 reads, with the spectral colorimeter 131, each patch formed on the transfer paper by

TABLE 2

| | | | | | Calibration chart information | | | | |
|---|---|---|---|---|---|---|---|---|---|
| Patch No. | X Position (mm) | Y Position (mm) | Width (mm) | Height (mm) | C Density | M Density | Y Density | K Density | Quality Standard |
| 301 | 130 | 50 | 30 | 30 | 250 | 250 | 250 | 250 | 4.50 |
| 302 | 130 | 80 | 30 | 30 | 200 | 200 | 200 | 200 | 4.75 |
| 303 | 130 | 110 | 30 | 30 | 150 | 150 | 150 | 150 | 5.00 |
| 304 | 130 | 140 | 30 | 30 | 100 | 100 | 100 | 100 | 5.25 |
| 305 | 130 | 170 | 30 | 30 | 50 | 50 | 50 | 50 | 5.50 |
| 306 | 130 | 200 | 30 | 30 | 250 | 250 | 250 | 250 | 4.50 |
| 307 | 130 | 230 | 30 | 30 | 200 | 200 | 200 | 200 | 4.75 |
| 308 | 130 | 260 | 30 | 30 | 150 | 150 | 150 | 150 | 5.00 |
| 309 | 130 | 280 | 30 | 30 | 100 | 100 | 100 | 100 | 5.25 |
| 310 | 130 | 310 | 30 | 30 | 50 | 50 | 50 | 50 | 5.50 | s302: Printing Instruction

After the creation of the calibration chart (Step s301), the printing control unit 103 instructs the image forming unit 110 to print the chart image and also instructs the paper feeding control unit 104 to start feeding the transfer paper (Step s302).

s303: Line Sensor Reading Instruction

After the printing instruction (Step s302), the state management unit 101 instructs the line sensor control unit 107 and the colorimeter control unit 108 to read the chart image the image forming unit 110. The colorimetric value of patch (L*a*b*/XYZ etc.) is sent to the storage unit 102 via the state management unit 101. Non-device-dependent L*a*b* or XYZ can be obtained by converting device-dependent RGB values or CMYK values of the color space using a profile. The profile can be stored in the storage unit 102.

The calibration chart colorimetric result is illustrated in Table 3.

TABLE 3

Colorimetric result of calibration chart by spectral colorimeter

| Patch No. | Colorimetric Value | | |
|---|---|---|---|
| | L* | a* | b* |
| 301 | 39.17 | 3.58 | −4.78 |
| 303 | 79.16 | −9.17 | 9.84 |
| 304 | 99.74 | −2.64 | 1.28 |
| 305 | 118.31 | −4.57 | 6.52 |
| 306 | 132.33 | −5.46 | 5.74 |
| 307 | 39.78 | −0.76 | −6.00 |
| 309 | 77.21 | −1.96 | 4.38 |
| 310 | 100.62 | −5.62 | 3.11 | s308: Calculating Calibration Value

The calibration unit 109 determines each patch from the transfer paper image and detects the patch density (RGB/CMYK) (Step s305), calculates a calibration parameter to the line sensor 130 from the patch density and the colorimetric value of the spectral colorimeter 131, and then stores the calibration parameter in the storage unit 102. After that, the process is closed. When the line sensor 130 performs reading for the normal image forming calibration, the calibration value can be used for the calibration of the line sensor 130. Further, in order to check the result of the calibration, the chart can be read again by the line sensor, the spectral colorimeter or the like to check accuracy of the calibration. The flow of calculating the calibration value is described later below.

s309: Check Needed?

When the operation mode is set at the calibration mode, the state management unit 101 sets the operation mode at the calibration check mode for checking the calibration accuracy by reading the chart again for checking the calibration result, and then returns to s301. When the operation mode is set at the calibration check mode, the calibration operation is completed.

Figure 7:
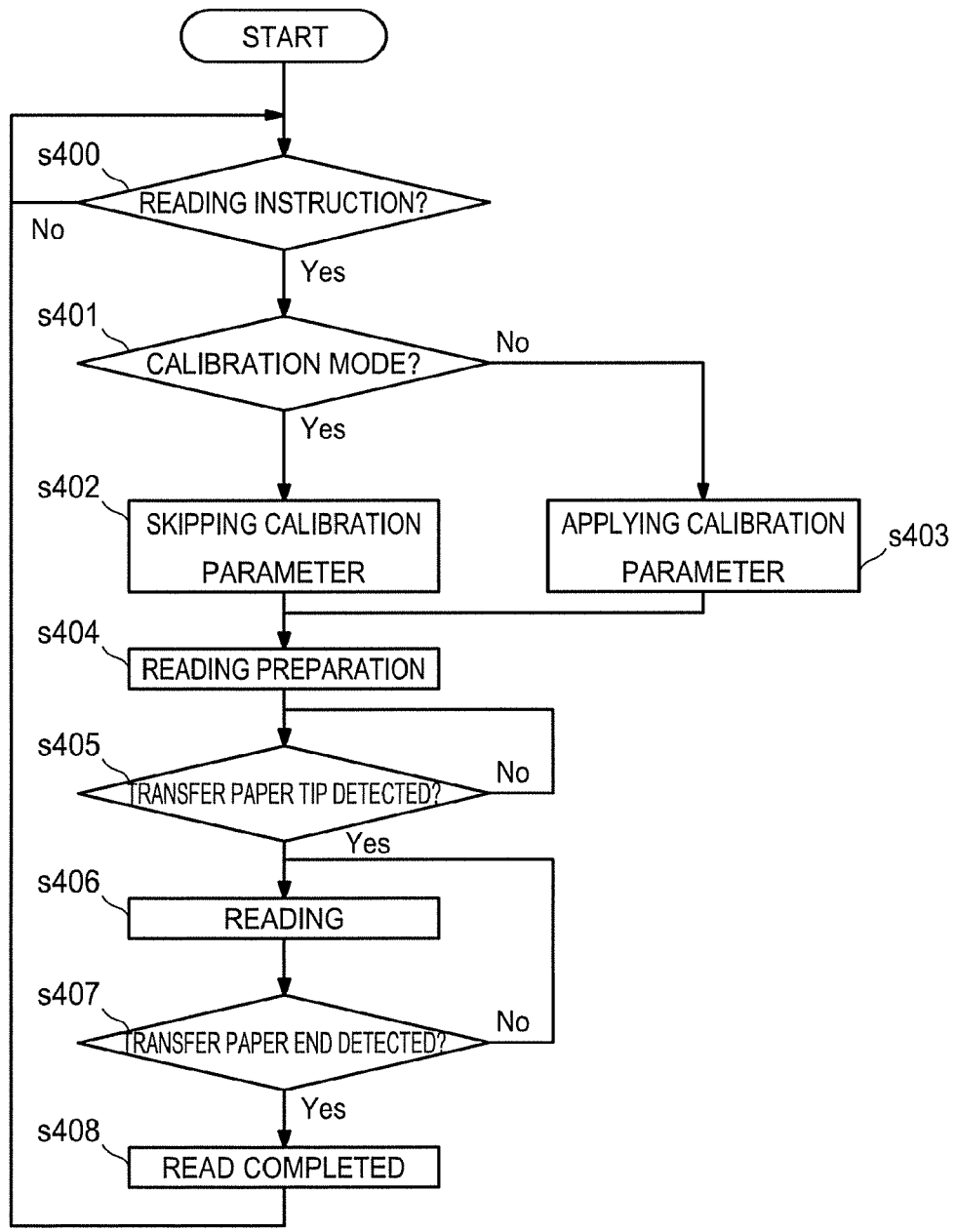
FIG. 7 shows a flowchart of procedure for line sensor control thereof.

The following describes procedure of the line sensor control unit with reference to the flowchart shown in FIG. 7. The following procedure is performed under control by the control unit 100.

s400: Reading Instruction Received?

The line sensor control unit 107 determines, upon starting its control processes, whether there is a reading instruction of the transfer paper received from the state management unit 101 (Step s400). If there is no reading instruction (Step s400, No), the line sensor control unit 107 waits until an instruction is made.

s401: Detection-Unit Calibration Mode?

If there is a reading instruction (Step s400, Yes), the line sensor control unit 107 determines, based on the reading instruction received from the state management unit 101, whether the current operation mode is set at the detection-unit calibration mode (Step s401).

As illustrated in Table 4, the detection-unit calibration parameter may be or may not be applied depending on the operation mode.

TABLE 4

Calibration parameter setting

| Operation Mode | Calibration Parameter Application |
|---|---|
| Normal | Yes |
| Calibration | No | s402: Skipping Calibration Parameter

In case of the detection-unit calibration mode (Step s401, Yes), the line sensor control unit 107 being set at the detection-unit calibration mode sets the line sensor 130 at a skip mode where the calibration parameter is not applied (Step s402).

s403: Applying Calibration Parameter

In case of not being the detection-unit calibration mode (Step s401, No), the line sensor control unit 107 being set at the normal mode reads the calibration parameter from the storage unit 102 and applies the calibration parameter on the line sensor 130 (Step s403). An example of the calibration parameter is illustrated in Table 5.

TABLE 5

Calibration parameter (RGB LUT)

| Input R Value | Output R Value | Input G Value | Output G Value | Input B Value | Output B Value |
|---|---|---|---|---|---|
| 0 | 2 | 0 | 1 | 0 | 3 |
| 1 | 3 | 1 | 2 | 1 | 4 |
| 2 | 5 | 2 | 4 | 2 | 5 |
| 3 | 7 | 3 | 5 | 3 | 7 |
| . | . | . | . | . | . |
| . | . | . | . | . | . |
| . | . | . | . | . | . |
| 252 | 243 | 252 | 244 | 252 | 246 |
| 253 | 245 | 253 | 246 | 253 | 248 |
| 254 | 246 | 254 | 248 | 254 | 249 |
| 255 | 248 | 255 | 250 | 255 | 251 | s404: Reading Preparation

After the Steps s402 and s403, the line sensor control unit 107 starts reading preparation based on the information received by the reading instruction from the state management unit 101 indicating the transfer paper size, the patch position and the like (Step s404).

s405: Transfer Paper Tip Detected?

After the reading preparation (Step s404), the line sensor control unit 107 checks if a line-sensor transfer paper detection sensor 130A is ON (Step s405), and waits until it is ON (Step s405, No). When it is ON (Step s405, Yes), the line sensor control unit 107 determines that the tip of the transfer paper is detected and moves on to the next process (Step s406).

s406: Line Sensor Reading

When the transfer paper tip is detected (Step s405, Yes), the line sensor control unit 107 reads an image line by line at reading intervals (Step s406).

s407: Transfer Paper End Detected?

After the reading (Step s406), the line sensor control unit 107 checks if the line-sensor transfer paper detection sensor 130A is OFF (Step s407, Yes). When it is OFF, the line sensor control unit 107 determines that the transfer paper end is detected and moves on to a next process (Step s408). When the transfer paper end detection is not OFF (Step s407, No), the procedure returns to Step s406 and continues the reading.

s408: Reading Completed

When the transfer paper end is detected (Step s407, Yes), the line sensor control unit 107 sends the read image on the transfer paper to the calibration unit 109 via the state management unit 101 and waits for a reading instruction (to Step s400).

Figure 8:
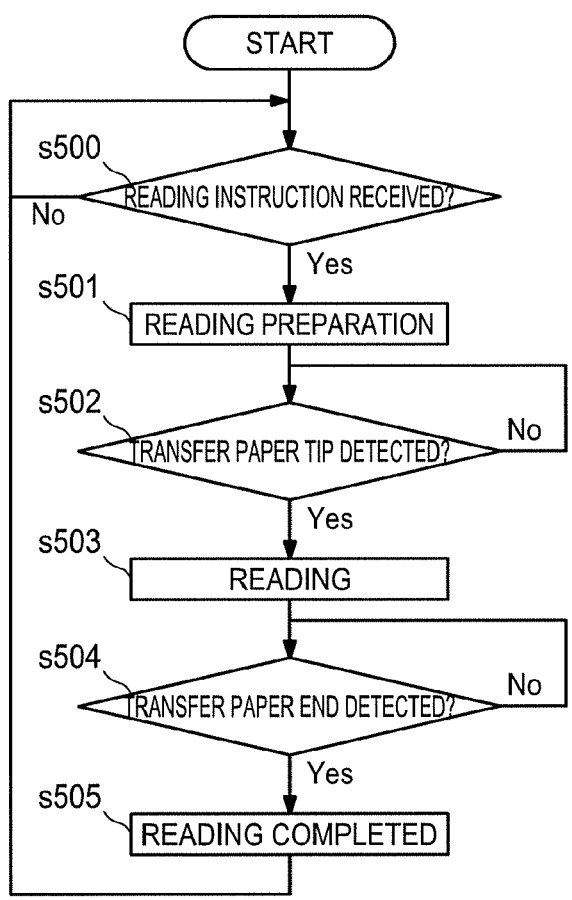
FIG. 8 shows a flowchart of procedure for colorimeter control thereof.

The following describes procedure for colorimeter control with reference to the flowchart shown in FIG. 8. The following procedure is performed under control by the control unit 100.

s500: Reading Instruction Received?

The colorimeter control unit 108 determines whether there is a reading instruction of the transfer paper from the state management unit 101 (Step s500). If there is no reading instruction, the colorimeter control unit 108 waits until there is an instruction (Step s500, No).

s501: Reading Preparation

When there is a reading instruction (Step s500, Yes), the colorimeter control unit 108 starts reading preparation based on the information received by the reading instruction from the state management unit 101 indicating the transfer paper size, the patch position and the like (Step 501).

s502: Transfer Paper Tip Detected?

After the reading preparation, the colorimeter control unit 108 checks if a colorimetry-object bearing transfer paper detection sensor 131A is ON (Step s502). When it is ON (Step s502, Yes), the colorimeter control unit 108 determines that the tip of the transfer paper is detected and moves on to the next process. If the transfer paper tip is not detected (Step s502, No), the colorimeter control unit 108 waits until it is detected.

s503: Reading

When the transfer paper tip is detected (Step s502, Yes), the colorimeter control unit 108 starts to measure color upon reaching the each position of the patch instructed by the reading instruction (Step s503).

s504: Transfer Paper End Detected?

The colorimeter control unit 108 checks whether the colorimetry-object bearing transfer paper detection sensor 131A is OFF. When it is OFF, the colorimeter control unit 108 determines that the transfer paper end is detected and moves on to a next process (Step s505). If it is not OFF (Step s504, No), the colorimeter control unit 108 waits until the transfer paper end is detected.

s505: Reading Completed

After the transfer paper end is detected (Step s504), the colorimeter control unit 108 sends the colorimetric value of each patch, specified by the reading instruction, to the calibration unit 109 via the state management unit 101 and then waits until there a reading instruction (to Step s500).

Figure 9:
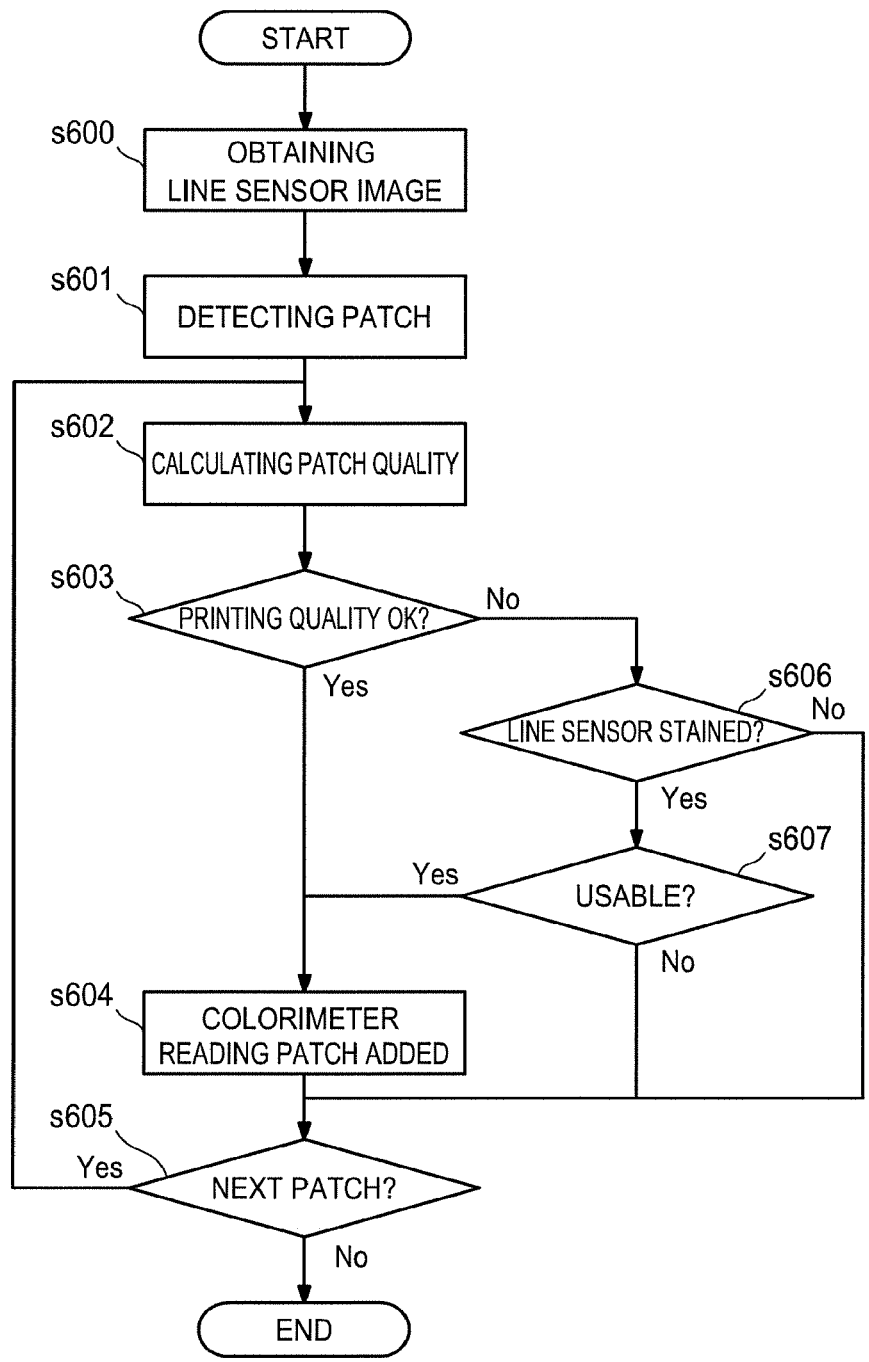
FIG. 9 shows a flowchart of procedure for patch quality determination thereof.

The following describes procedure for the quality determining unit 140 to determine the quality of the transfer image read by the line sensor with reference to the flowchart shown in FIG. 9. The following procedure is performed under control by the control unit 100.

s600: Obtaining Line Sensor Image

The quality determining unit 140 obtains the transfer paper image read by the line sensor 130 from the storage unit 102 via the state management unit 101.

s601: Detecting Patch

Figure 13:
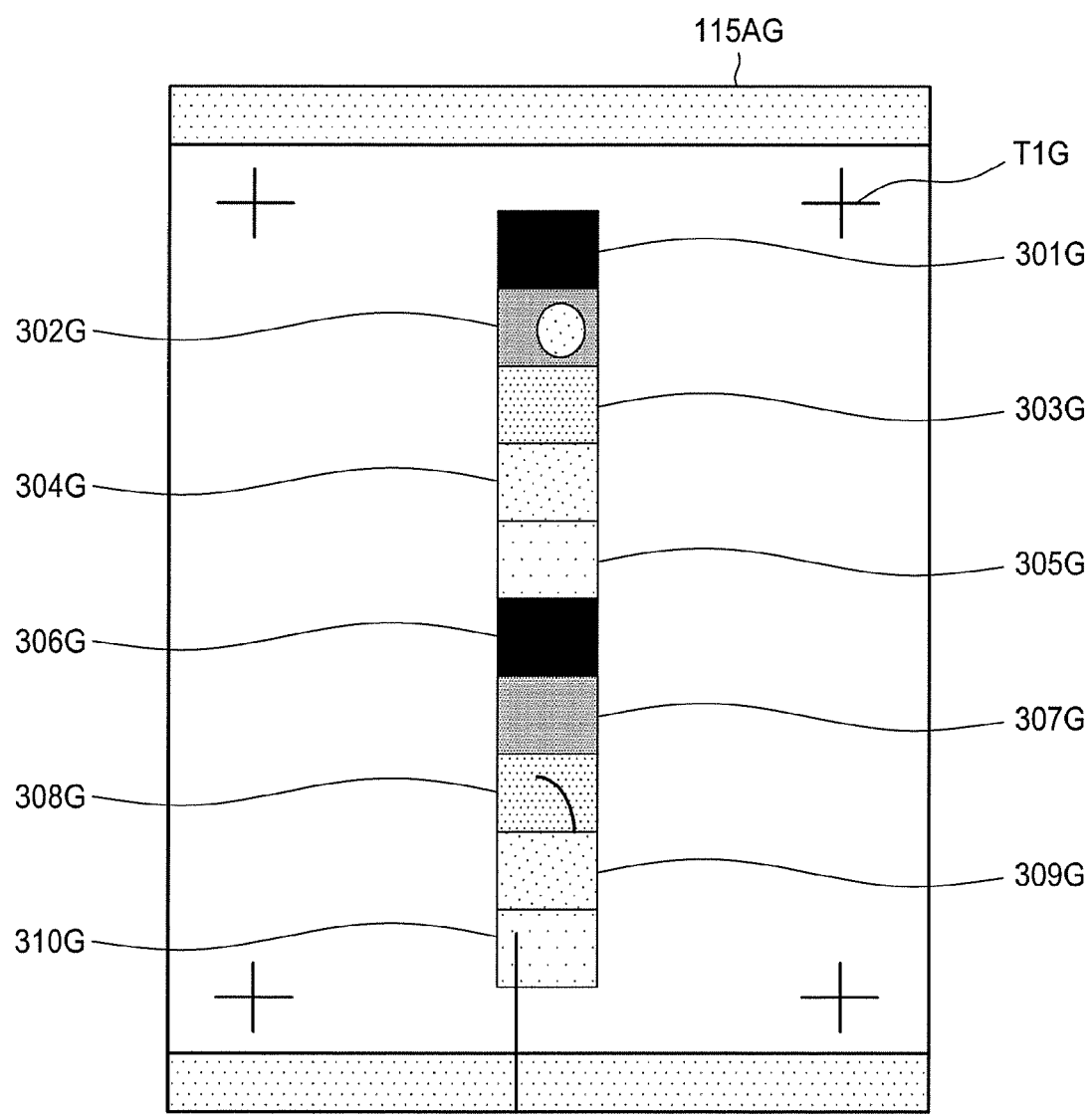
FIG. 13 shows a transfer image read from the calibration chart display used for detection-unit calibration thereof.

The quality determining unit 140 detects the patch position on the transfer paper image, from the chart information stored in the storage unit 102 and the positions of the crop marks on the read image. The transfer paper image of the calibration chart read by the line sensor 130 is illustrated in FIG. 13.

The transfer paper image includes an image 115AG corresponding to the background board 115A on the conveying path 115, images corresponding to the crop marks T0 to T4 (e.g., a crop mark image T1G), and transfer images 301G to 310G corresponding to the patch images 301 to 310.

S602: Calculating Patch Quality

The quality determining unit 140 performs sampling of the pixel values (RGB/CMYK etc.) of the patch image on the read image based on the patch positions. For example, the sum of standard deviation of the patch pixel values of each color channel is calculated as a patch quality indicator indicating the margin of error. The pixel values of the patches and the patch quality indicator are registered in the storage unit 102.

In the example shown in FIG. 13, a plurality of pixel values in the patch area are sampled for the patch images 301 to 310 (See FIG. 12) on the transfer paper. The obtained transfer image 302G has uneven printing, the transfer image 308G has a scratch, and the transfer image 310G has line-shape noise. The quality indicator of these three patches are calculated higher than those of other patches.

Table 6 shows a reading result of the calibration chart. The quality standard of each patch is illustrated in Table 2.

TABLE 6

Reading result of calibration chart by line sensor

| Patch No. | Average Measurement Value | | | Quality Indicator Value | Within Quality Standard | Usable for Calibration |
|---|---|---|---|---|---|---|
| | R | G | B | | | |
| 301 | 12.2 | 10.5 | 14.8 | 0.85 | OK | YES |
| 302 | 52.5 | 57.7 | 49.6 | 32.91 | NG | NO |
| 303 | 101.1 | 98.4 | 107.2 | 1.20 | OK | YES |
| 304 | 160.8 | 154.3 | 155.0 | 0.98 | OK | YES |
| 305 | 212.4 | 208.6 | 213.3 | 1.36 | OK | YES |
| 306 | 10.0 | 11.9 | 15.7 | 1.04 | OK | YES |
| 307 | 55.3 | 51.2 | 52.4 | 1.27 | OK | YES |
| 308 | 99.8 | 102.0 | 106.1 | 14.73 | NG | NO |
| 309 | 159.7 | 152.1 | 154.5 | 1.32 | OK | YES |
| 310 | 210.4 | 206.6 | 211.9 | 14.69 | NG | YES | s603: Printing Quality OK?

The quality determining unit 140 determines whether the patch quality indicator is within the patch quality standard.

s604: Colorimeter Reading Patch Added

When the printing quality is within the quality standard (Step s603, Yes), the quality determining unit 140 registers those patches that have the patch quality indicator within the patch quality standard as being usable for the calibration so as to be the colorimeter target by the spectral colorimeter 131.

In FIG. 13, the patches 301, 303 to 307, and 309 are added as the colorimeter target patches for the spectral colorimeter 131.

s605: Next Patch?

The quality determining unit 140 refers to the chart information whether there is a next patch, and, if there is a next patch, moves on to Step s602 to detect the patch. If there is no next patch, the procedure is closed.

s606: Line Sensor Stained?

When the patch quality indicator is not within the quality standard at the quality determining unit 140 (Step s603, No), it is determined whether the cause is printing of the chart or a stain of the line sensor 130.

The determination process is made on the patches 302, 308 and 310 that are determined as being out of the patch quality standard. When the line-shape noise that continues along the paper feeding direction further continues to the background board image 115AG, like on the transfer image 310G, it is determined that the cause is a dust attached to the line sensor 130. When the cause is not a stain on the line sensor (Step s606, No), the procedure moves on to Step s605 to determine whether there is a next patch.

s607: Usable?

The quality determining unit 140 determines whether those patch images with defective image due to a stain of the line sensor 130 (Step s606, Yes) are usable for calibration or not.

The area with the stain on the patch is considered as a defective area. When the size of the defective area is the predetermined value (for example, below 30%) of the patch size, the pixel values outside the defective area are sampled again and updated on the storage unit 102 as the colorimetric values. Further, the patch is registered as being usable for the calibration by the spectral colorimeter 131 and set as targets to be measured by the spectral colorimeter 131. The predetermined value above is previously set and stored in the storage unit 102 and the like, or can be set by a user through the operation unit 121. When the patch image with a defective image is detected, a user can determine if the patch image is usable or not through the operation unit 121.

As for the transfer image 310G of the patch 310, which is defective due to a stain of the line sensor, the pixel values of the area excluding the line-shape noise are sampled again to be updated as the measurement values of the patch. The patch 310 is added as the colorimeter target patch for the spectral colorimeter 131. In conclusion, if usable (Step s607, Yes), the procedure moves on to Step s604 and selects the colorimeter reading patch, and if not usable (Step s607, No), the procedure moves on to Step s605 and determines whether there is a next patch.

As for those patches that are determined as defective due to the chart printing at Step s606, if the deficiency is small, the image can be processed and the area excluding the defective area can be colorimeter targets for the spectral colorimeter 131. For example, when there is a scratch or a line at the end of the patch, the color of the center of the patch can be measured by the spectral colorimeter 131 so that the effect of the deficiency can be avoided.

Figure 10:
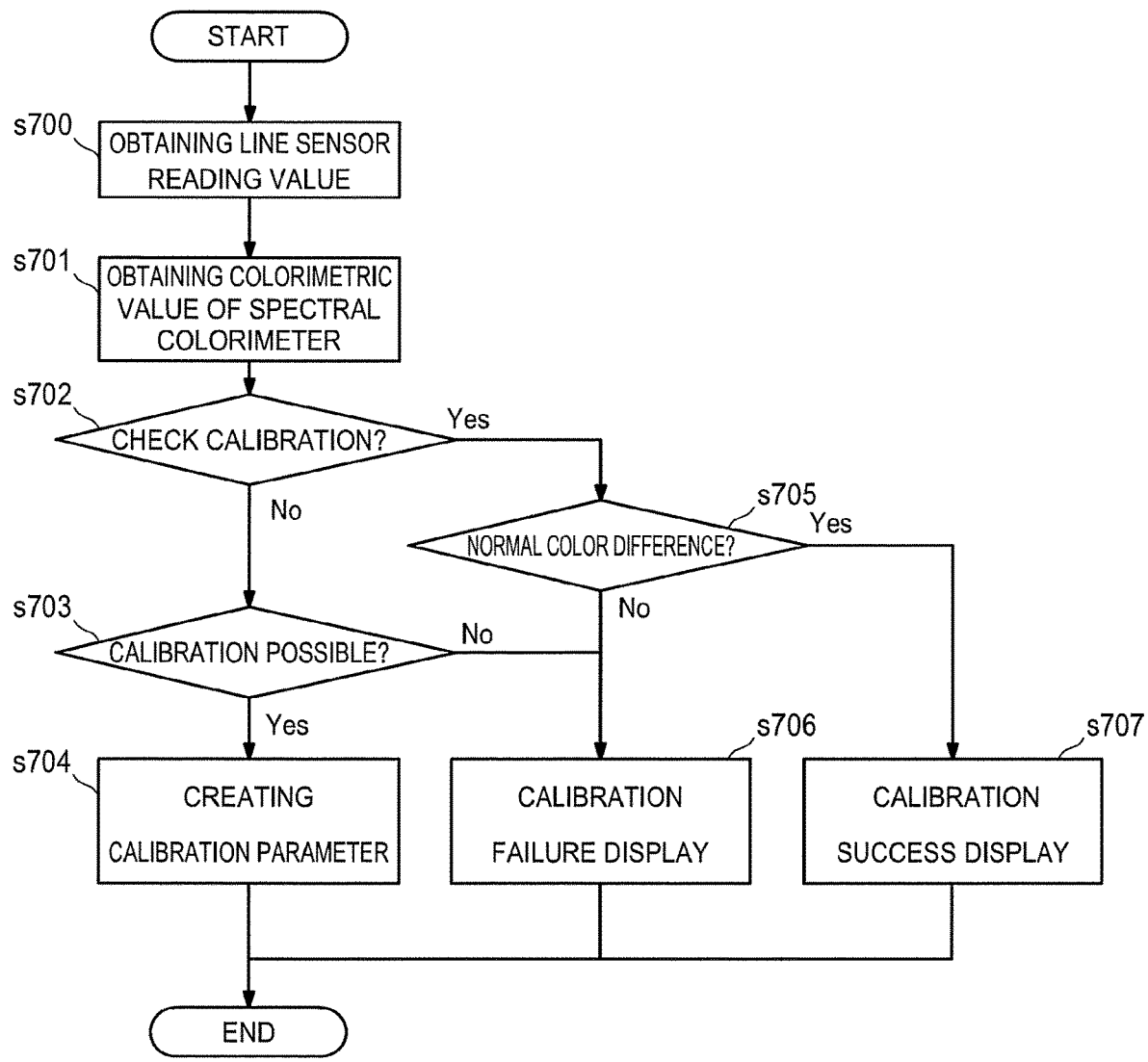
FIG. 10 shows a flowchart of procedure for calculating a calibration value thereof.

The following describes procedure for calculating the calibration value for the line sensor 130 based on the detection result of the image by the line sensor 130 and the spectral colorimeter 131 with reference to the flowchart shown in FIG. 10. The following procedure is performed under control by the control unit 100.

s700: Obtaining Line Sensor Reading Value

The calibration unit 109 obtains a measurement value of the line sensor 130 from the storage unit 102 via the state management unit 101.

s701: Obtaining Colorimetric Value of Spectral Colorimeter

The calibration unit 109 obtains the colorimetric value of the spectral colorimeter 131 from the storage unit 102 via the state management unit 101.

s702: Check Calibration?

The calibration unit 109 determines whether the operation mode is set at the calibration check mode. In case of the calibration check mode (Step s702, Yes), a check process is performed to check whether the difference of the measurement value of the line sensor 130 and the colorimetric value of the spectral colorimeter 131 is predetermined value (to Step s705). In case of the calibration mode (Step s702, No), a process to create a calibration parameter for the line sensor 130 is performed based on the measurement value of the line sensor 130 and the colorimetric value of the spectral colorimeter 131 (to Step s703).

s703: Calibration Possible?

The calibration unit 109 determines whether calibration can be made at sufficient accuracy based on the colorimetric data measured by the line sensor 130 and the spectral colorimeter 131. When the colorimetric values of patches of all densities are given or when the data corresponding to a specific density is lacking yet can be substituted by estimating from data of other densities, it is determined that the calibration is possible (Step s703, Yes) and a calibration parameter is created (to Step s704). The method of substitution is previously determined. If the calibration is not possible (Step s703, No), a notification indicating the failure of calibration is displayed (Step s706).

Out of a total of ten patches with five kinds of densities, the patches 301, 303 to 307, 309 and 310 measured by the spectral colorimeter 131 cover all five kinds of densities, and therefore it is determined that the calibration is possible.

s704: Creating Calibration Parameter

The calibration unit 109 calculates a calibration parameter of the line sensor 130 based on colorimetric data measured by the line sensor 130 and the spectral colorimeter 131.

s705: Normal Color Difference?

The calibration unit 109 calculates the color difference between the measurement value of the line sensor 130 and the colorimetric value of the spectral colorimeter 131 and determines whether color difference is within a predetermined value (for example, $\Delta E \leq 1.0$). If the color difference is normal (Step s705, Yes), a notification indicating the success of calibration is displayed (Step s707). If the color difference is not normal (Step s705, No), a notification indicating the failure of calibration is displayed (Step s706).

s706: Calibration Failure Display

The calibration unit 109 notifies a user by displaying a notification indicating that the calibration is not possible on the operation unit 121.

It is preferable that a notification is displayed for encouraging a user to clean the line sensor or adjust the image forming unit, or that re-calibration button is displayed for encouraging the user to operate the re-calibration.

s707: Calibration Success Display

The calibration unit 109 notifies a user by displaying a notification indicating the success of calibration on the operation unit 121.

After the Steps s704, s706, and s707, the process is closed.

Second Embodiment

In the previous embodiment, the patch image is formed in a single line along the sub scanning direction corresponding to the readable area of the spectral colorimeter 131. In this embodiment, the spectral colorimeter 131 is configured to be movable along the main scanning direction so that a different patch image created along the main scanning direction is also readable. The same reference number is used for the same configuration as the previous embodiment, and the description thereof is omitted or simplified.

Figure 14:
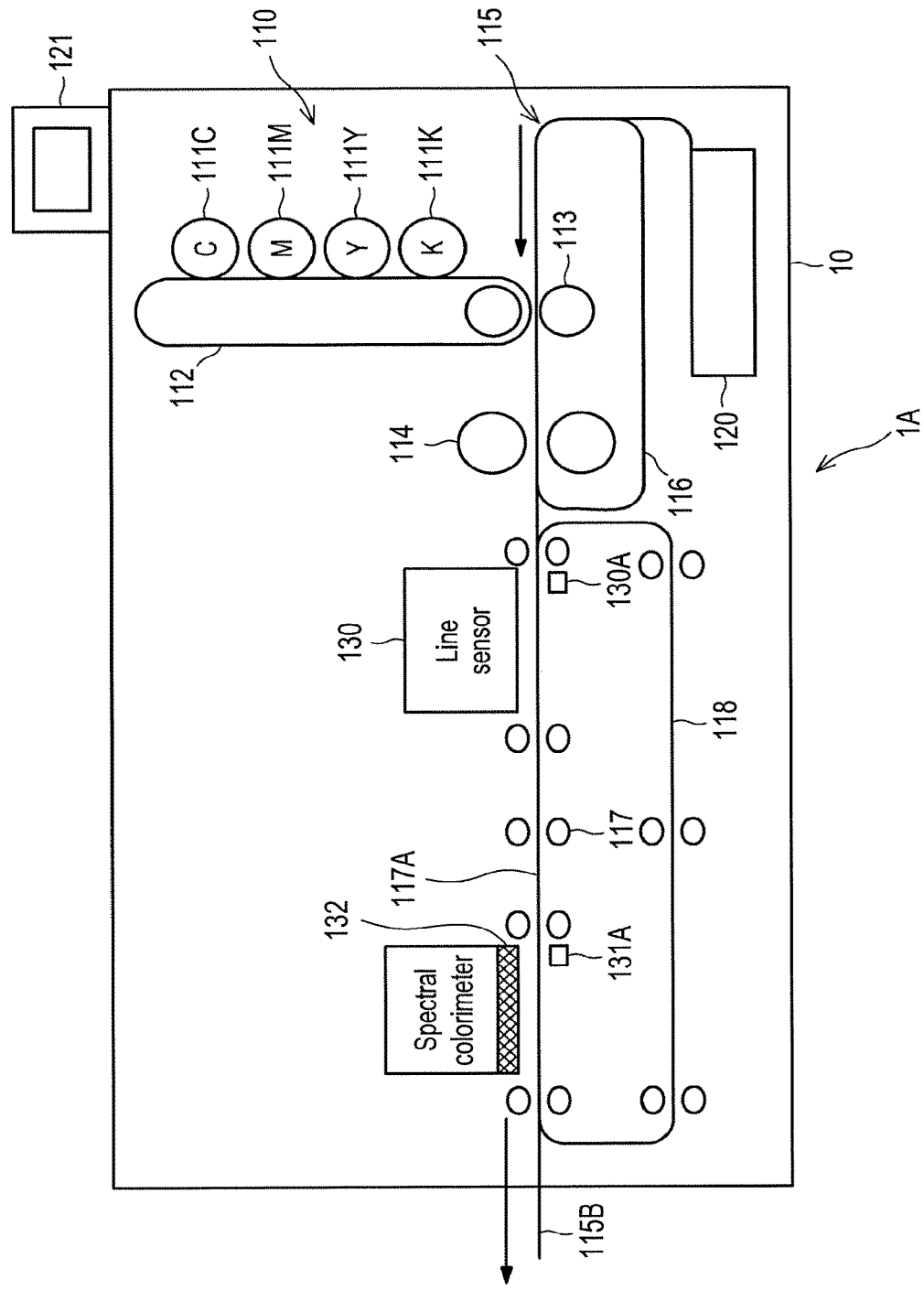
FIG. 14 shows an image forming system including a colorimeter moving unit according to another embodiment of the present invention.

In an image forming system 1A according to the present embodiment, the spectral colorimeter 131 is supported by a colorimeter moving unit 132 on the conveying path 115 as shown in FIG. 14. The colorimeter moving unit 132 can be moved along the main scanning direction with use of a driving unit such as a driving motor, and the movement is controlled by the control unit 100. The configuration of the colorimeter moving unit 132 is not limited to this particular configuration.

Figure 15:
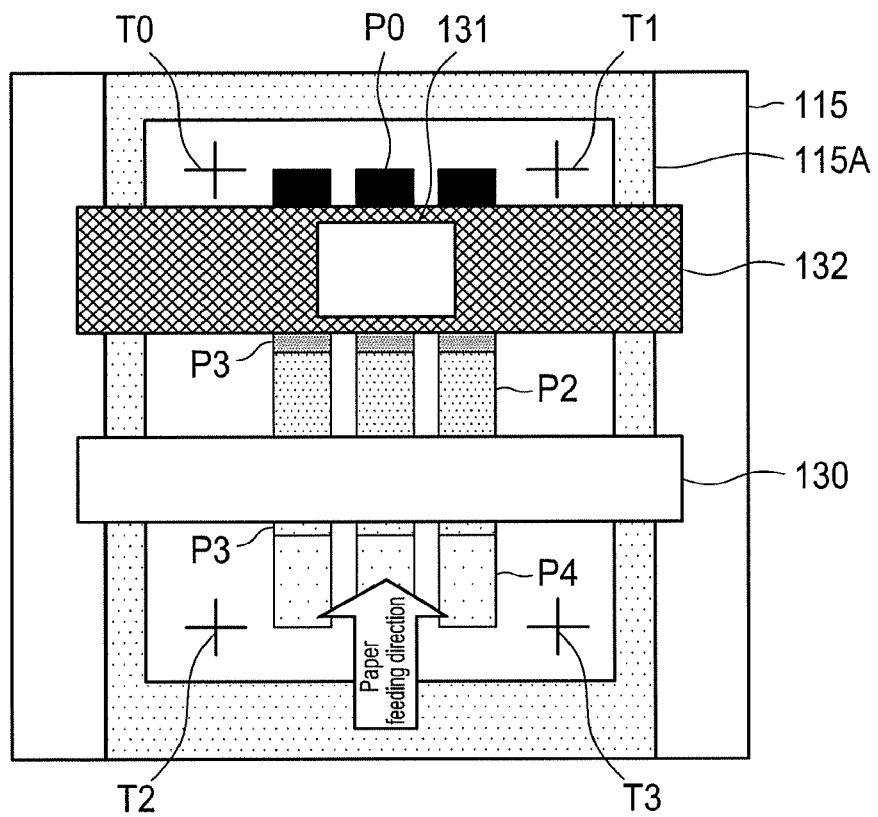
FIG. 15 shows a plan view illustrating an arrangement relation of a first image detection unit and a second image detection unit thereof.

As shown in FIG. 15, the spectral colorimeter 131 is supported by the colorimeter moving unit 132, and thus the spectral colorimeter 131 can be moved along the main scanning direction by the colorimeter moving unit 132. As shown in the figure, a plurality of patch images having the same densities are formed along the main scanning direction and also patch images on a plurality of lines are formed along the sub scanning direction. The spectral colorimeter 131 can measure colors of the predetermined area, and, because the spectral colorimeter 131 is movable by the colorimeter moving unit 132, the spectral colorimeter 131 can also read images at different positions along the main scanning direction. As a result, the spectral colorimeter can avoid using a detection result of patch images on a line with defective images, and instead use only the suitable reading images to perform the color measurement.

Figure 16:
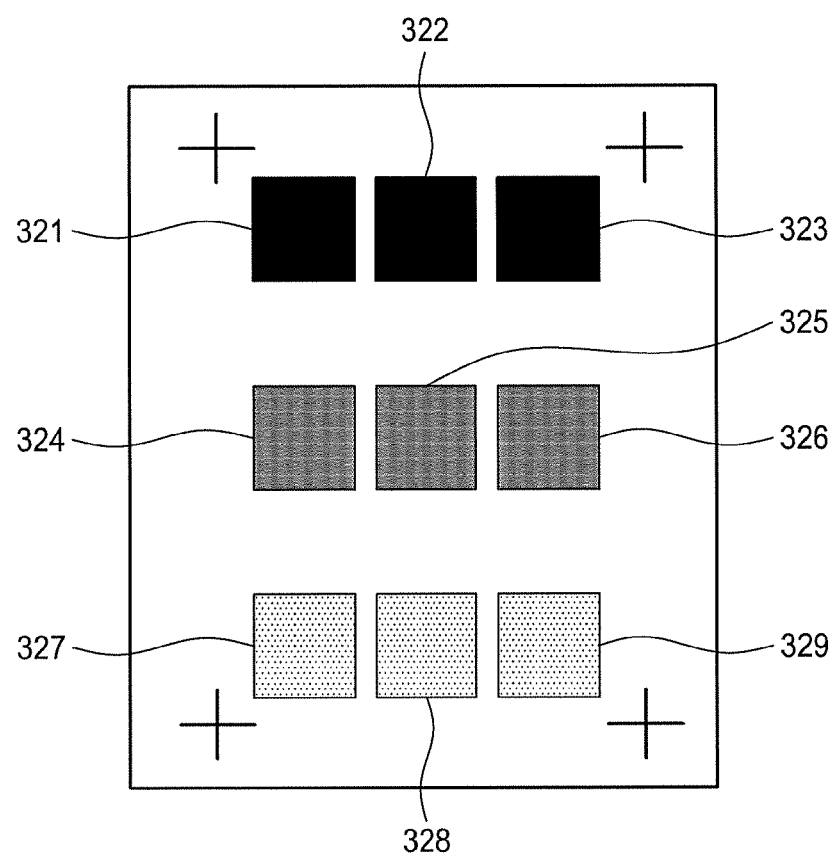
FIG. 16 shows a calibration chart display used for detection-unit calibration thereof.

As for the patch image, the patch image having the same density is formed along the main scanning direction as shown in FIG. 16. The information on the patch image is shown in Table 7.

The patch images 321 to 323 have the same density, the patch images 324 to 326 have the same density, and the patch images 327 to 329 have the same density. The patch images 321 to 323, the patch images 324 to 326, and the patch images 327 to 329 are formed in different image densities. As for the scale of the density along a line, the patch image 321 has higher density than the patch image 324, and the patch image 324 has higher density than the patch image 327. With these patch images, the reading result of the image with image deficiency may not be used, and the reading result of other images having the same density can be used instead.

TABLE 7

Calibration chart information

| Patch No. | X Position (mm) | Y Position (mm) | Width (mm) | Height (mm) | C Density | M Density | Y Density | K Density | Quality Standard |
|---|---|---|---|---|---|---|---|---|---|
| 321 | 40 | 50 | 30 | 30 | 250 | 250 | 250 | 250 | 4.00 |
| 322 | 120 | 50 | 30 | 30 | 150 | 150 | 150 | 150 | 5.00 |
| 323 | 200 | 50 | 30 | 30 | 50 | 50 | 50 | 50 | 5.50 |
| 324 | 40 | 150 | 30 | 30 | 250 | 250 | 250 | 250 | 4.00 |
| 325 | 120 | 150 | 30 | 30 | 150 | 150 | 150 | 150 | 5.00 |
| 326 | 200 | 150 | 30 | 30 | 50 | 50 | 50 | 50 | 5.50 |
| 327 | 40 | 250 | 30 | 30 | 250 | 250 | 250 | 250 | 4.00 |
| 328 | 120 | 250 | 30 | 30 | 150 | 150 | 150 | 150 | 5.00 |
| 329 | 200 | 250 | 30 | 30 | 50 | 50 | 50 | 50 | 5.50 |

The following describes a quality determination of an image and colorimeter control. The contents of the procedure are the same as the flows shown in FIG. 8 and FIG. 9.

s600: Obtaining Line Sensor Image

The quality determining unit 140 obtains the transfer paper image read by the line sensor 130 from the storage unit 102 via the state management unit 101.

s601: Detecting Patch

Figure 17:
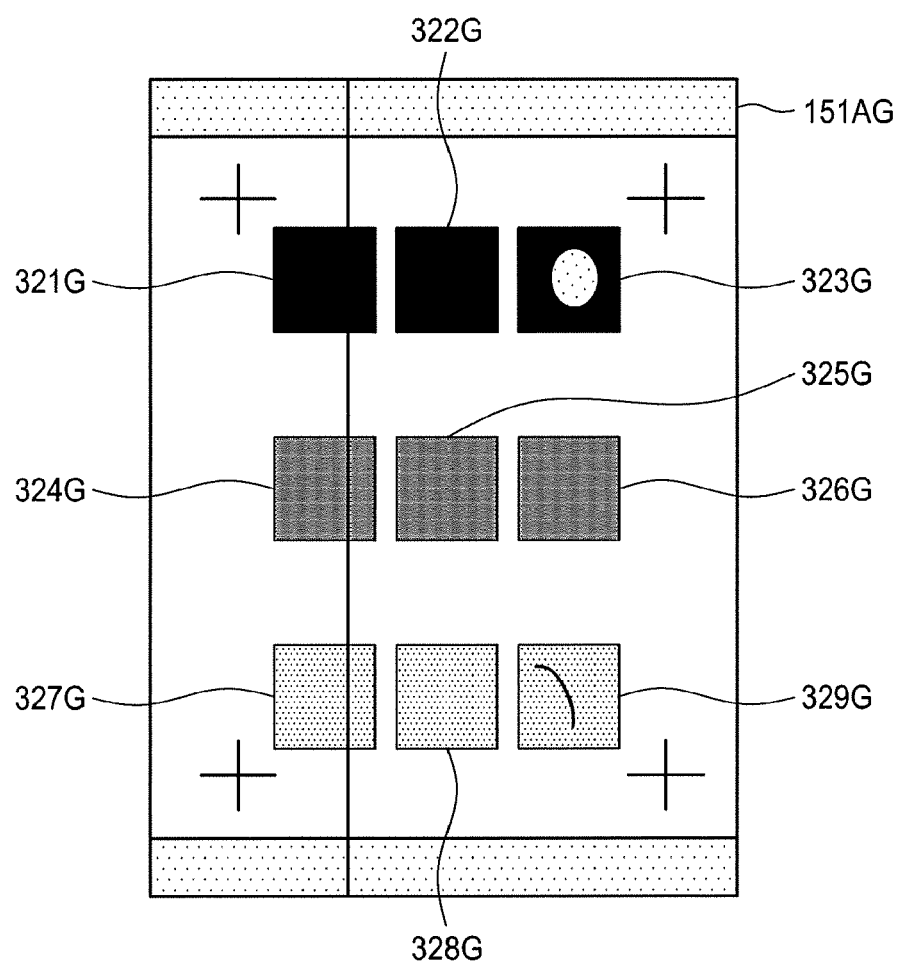
FIG. 17 shows a transfer image read from the calibration chart display used for detection-unit calibration thereof.

The quality determining unit 140 detects the patch position on the transfer paper image, based on the chart information stored in the storage unit 102 and the crop mark position on the read image. The transfer paper image obtained by the line sensor 130 reading the calibration chart is illustrated in FIG. 17. On the transfer paper image, a background image 151AG and transfer images 321G to 329G are detected based on the patch images.

s602: Calculating Patch Quality

The quality determining unit 140 samples pixel values (RGB/CMYK etc.) of the patch image on the read image based on the patch position. For example, the sum of the standard deviation of the patch pixel values of each color channel is calculated as a patch quality indicator indicating margin of error. The patch pixel values and the patch quality indicator are stored in the storage unit 102.

In an example shown in FIG. 17, a plurality of pixel values in the patch area are sampled for these patches 321 to 329 (see FIG. 16) of the transfer paper image. The obtained transfer image 323G has uneven printing, the transfer image 329G has a scratch, and the transfer images 321G, 324G and 327G have line-shape noise. The quality indicators of these three patches are calculated higher than those of other patches.

The reading results of the calibration chart are shown in Table 8 and the quality standard of each patch is shown in Table 8.

TABLE 8

Reading result of calibration chart by line sensor

| Patch No. | Average Measurement Value | | | Quality Indicator Value | Within Quality Standard | Usable for Calibration |
|---|---|---|---|---|---|---|
| | R | G | B | | | |
| 321 | 12.3 | 10.8 | 14.5 | 5.95 | NG | YES |
| 322 | 101.9 | 98.6 | 107.2 | 0.85 | OK | YES |
| 323 | 212.0 | 208.2 | 213.1 | 34.06 | NG | NO |
| 324 | 9.3 | 13.7 | 12.7 | 6.07 | NG | YES |
| 325 | 103.8 | 97.4 | 105.9 | 0.89 | OK | YES |
| 326 | 211.4 | 209.3 | 210.2 | 1.34 | OK | YES |
| 327 | 11.2 | 11.5 | 15.8 | 7.21 | NG | YES |

TABLE 8-continued

Reading result of calibration chart by line sensor

| Patch No. | Average Measurement Value | | | Quality Indicator Value | Within Quality Standard | Usable for Calibration |
|---|---|---|---|---|---|---|
| | R | G | B | | | |
| 328 | 103.6 | 100.1 | 104.3 | 0.76 | OK | YES |
| 329 | 213.7 | 207.0 | 209.4 | 15.78 | NG | NO | s603: Printing Quality OK?

The quality determining unit 140 determines whether the patch quality indicator is within the quality standard of the patch.

s604: Colorimeter Reading Patch Added

When the printing quality is within the quality standard (Step s603, Yes), the quality determining unit 140 registers those patches that have the patch quality indicator within the patch quality standard as being usable for the calibration so as to be the colorimeter target for the spectral colorimeter 131.

In FIG. 17, the patches 322, 325, 326 and 329 are added as the colorimeter target patches for the spectral colorimeter 131.

s605: Next Patch?

The quality determining unit 140 refers to the chart information whether there is a next patch, and, if there is a next patch, moves on to Step s602 to detect the patch. If there is no next patch, the procedure is closed.

s606: Line Sensor Stained?

When the patch quality indicator is not within the quality standard at the quality determining unit 140, it is determined whether the cause is printing of the chart or a stain of the line sensor 130.

The determination process is made on the patches 321, 323, 324, 327 and 328 that are determined as being out of the patch quality standard. When the line-shape noise that continues along the paper feeding direction further continues to the background board image 151AG, like on the transfer images 321G, 324G and 327G, it is determined that the cause is a dust attached to the line sensor 130. When the cause is not a stain on the line sensor (Step s606, No), the procedure moves on to Step s605 to determine whether there is a next patch.

s607: Usable?

The quality determining unit 140 determines whether the those image patches with defective images due to the stain of the line sensor 130 are usable for calibration or not.

The area with the stain on the patch is considered as a defective area. When the size of the defective area is the predetermined value (for example, below 30%) of the patch size, the pixel values outside the defective area are sampled again and updated on the storage unit 102 as the colorimetric values. Further, the patch is registered as being usable for the calibration by the spectral colorimeter 131 and set as targets to be measured by the spectral colorimeter 131. The predetermined value above is previously set and stored in the storage unit 102 and the like, or can be set by a user through the operation unit 121. When the patch image with a defective image is detected, a user can determine if the patch image is usable or not through the operation unit 121.

As for the transfer images 321G, 324G and 327G of the patches 321, 324 and 327, which are defective due to a stain of the line sensor, the pixel values of the area excluding the line-shape noise are sampled again to be updated as the measurement values of the patch. The patches 321, 324 and 327 are added as the colorimeter target patches for the spectral colorimeter 131.

As for those patches that are determined as defective due to the chart printing at Step s606, if the deficiency is small, the image can be processed and the area excluding the defective area can be colorimeter targets for the spectral colorimeter 131. For example, when there is a scratch or a line at the end of the patch, the color of the center of the patch can be measured by the spectral colorimeter 131 so that the effect of the deficiency can be avoided.

s500: Reading Instruction Received?

The colorimeter control unit 108 determines whether there is a reading instruction of the transfer paper from the state management unit 101 (Step s500). If there is no reading instruction, the colorimeter control unit 108 waits until there is an instruction (Step s500, No).

s501: Reading Preparation

When there is a reading instruction (Step s500, Yes), the colorimeter control unit 108 starts reading preparation based on the information received by the reading instruction from the state management unit 101 indicating the transfer paper size, the patch position and the like. At this process, the colorimeter control unit 108 moves the spectral colorimeter 131 from the base position to the first patch position using the colorimeter moving unit 132.

The color measurement is prepared for those patches 321, 322, 324 to 327, and 329 in FIG. 16 that are determined as colorimeter targets by the quality determining unit 140.

s502: Transfer Paper Tip Detected?

It is checked whether the colorimetry-object bearing transfer paper detection sensor 131A is ON (Step s502). When it is ON (Step s502, Yes), it is determined that the tip of the transfer paper is detected and the procedure moves on to the next process. If the transfer paper tip is not detected (Step s502, No), the colorimeter control unit 108 waits until it is detected.

s503: Reading

After the reading preparation, the colorimeter control unit 108 moves, using the colorimeter moving unit 132, the spectral colorimeter 131 to each patch position specified by the reading instruction along the cross direction of the paper feeding direction to start the color measurement.

The movement of the spectral colorimeter 131 using the colorimeter moving unit 132 can be carried out once for each chart, and in this way, only the patches 321, 324, and 327 arranged in the paper feeding direction can be read. For example, in order to measure the color of the patches 321 and 322 arranged in the cross direction to the paper feeding direction, the conveying of the chart needs to be temporarily stopped while the spectral colorimeter is moved, which takes a lot of time for color measurement. Thus, in the way above, this time can be saved.

s504: Transfer Paper End Detected?

The colorimeter control unit 108 checks whether the colorimetry-object bearing transfer paper detection sensor 131A is OFF. When it is OFF, the colorimeter control unit 108 determines that the transfer paper end is detected and moves on to a next process (Step s505). If it is not OFF (Step s504, No), the colorimeter control unit 108 waits until the transfer paper end is detected.

s505: Reading Complete

After the transfer paper end is detected (Step s504), the colorimeter control unit 108 sends the colorimetric value of each patch, specified by the reading instruction, to the calibration unit 109 via the state management unit 101. Then, the colorimeter control unit 108 moves the spectral colorimeter 131 to the base position using the colorimeter moving unit 132 and waits until there a reading instruction (to Step s500).

To prevent a stain due to a paper dust or the like, it is preferable that the base position is arranged outside the colorimetric path 117A.

The detection result from the spectral colorimeter 131 is shown in Table 9.

TABLE 9

Colorimetric result of calibration chart by spectral colorimeter

| Patch | Colorimetric Value | | |
|---|---|---|---|
| No. | L* | a* | b* |
| 321 | 39.17 | 3.58 | −4.78 |
| 322 | 99.74 | −2.64 | 1.28 |
| 323 | 132.33 | −5.46 | 5.74 |
| 324 | 41.30 | −9.04 | 2.73 |
| 325 | 99.56 | −1.82 | 2.12 |
| 326 | 132.39 | −6.33 | 6.84 |
| 327 | 40.14 | 0.59 | −5.43 |
| 328 | 100.34 | −3.63 | 3.83 |
| 329 | 132.14 | −5.38 | 6.82 |

In this embodiment, the spectral colorimeter 131 is moved along the main scanning direction to allow to detect the patch images at different positions. Instead, the transfer paper can be moved along the main scanning direction to allow to detect the patch images at different positions. Both the spectral colorimeter 131 and the transfer paper can be movable along the main scanning direction.

Third Embodiment

Although the embodiments above describe reading of a patch image printed on a single side of the transfer paper, the reading of the image printed on the back side thereof can be also carried out.

Figure 18:
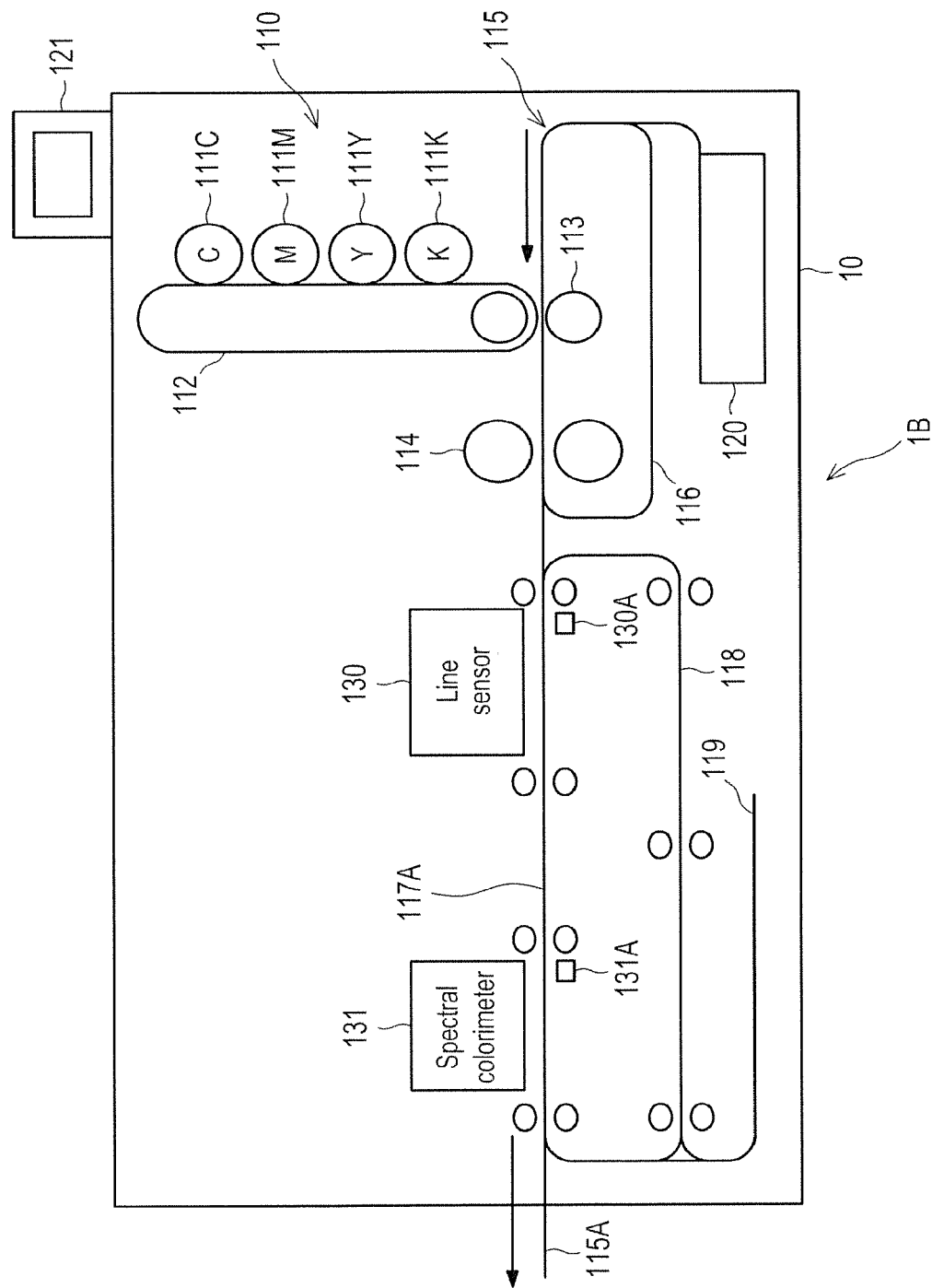
FIG. 18 shows an image forming system according to further another embodiment of the present invention.

FIG. 18 shows an image forming system 1B where the reverse path 119 is provided at the circulating path 118. Although not shown in the figure, with the circulating path 118, the transfer paper whose front and back are reversed through the reverse path 119 can be returned to the conveying path 115 at the upper stream side of the line sensor 130. The process is the same as the previous embodiment, and the description thereof is omitted or simplified with the same reference numbers attached.

Figure 19:
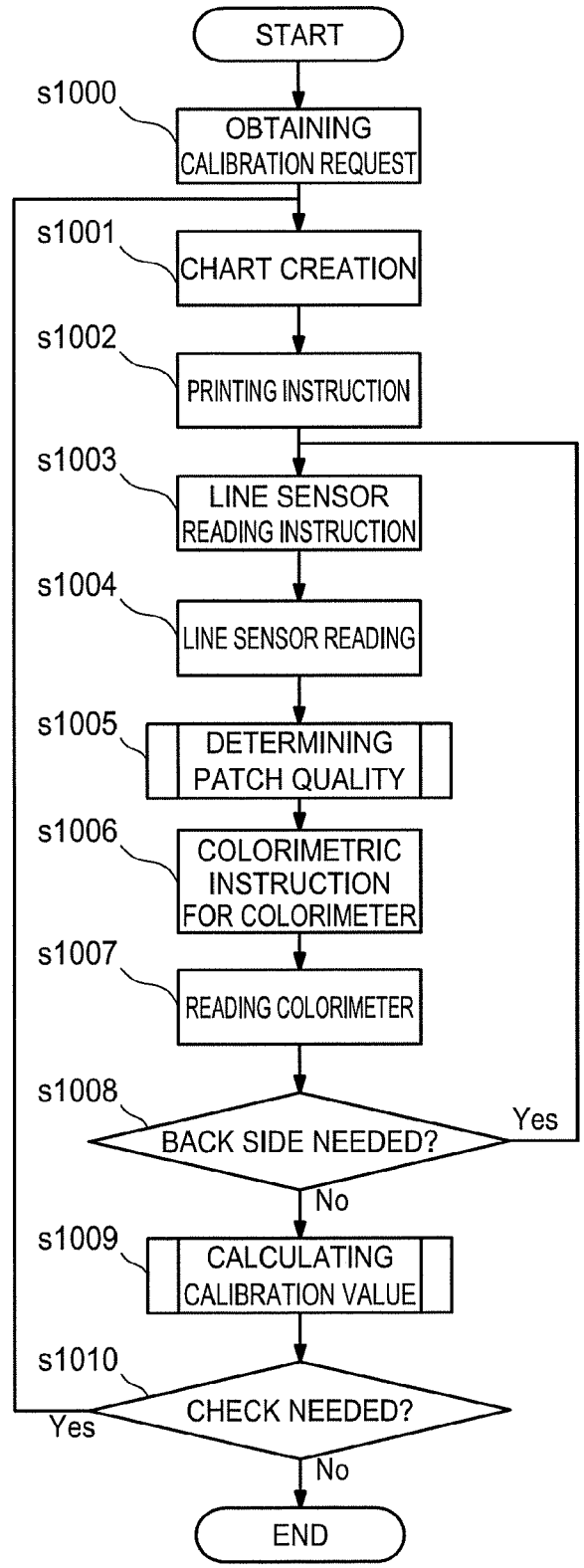
FIG. 19 shows a flowchart of procedure for a detection-unit calibration operation thereof.

The processing procedures for the overall flow, printing flow, and quality determining flow are the same as the first embodiment, and there is difference only in the calibration flow. Therefore, the following describes procedure for the calibration flow with reference to the flowchart shown in FIG. 19. The following procedure is performed under control by the control unit 100.

s1000: Obtaining Calibration Request

When the detection-unit calibration procedure starts, the calibration unit 109 receives a line sensor calibration request from the state management unit 101.

s1001: Chart Creation

After obtaining the calibration request (Step s1000), the state management unit 101 sends the detection-unit calibration chart information stored in the storage unit 102 to the printing control unit 103. The printing control unit 103 creates a chart image for the detection-unit calibration (Step s1001).

In order to make the printing on the back side of the transfer paper, the front and back sides of the paper are reversed through the reverse conveying path 116 after the fixing of the image, and the paper is circulated to the conveying path 115 at the upper stream side of the image forming unit 110. In order to form the patch image on the back side of the transfer paper, it is preferable that a chart is created for forming the back-side patch image at the positions where the front-side patch image is not formed so that the colorimetric value is not affected by the offset.

s1002: Printing Instruction

After the calibration chart is created (Step s1001), the printing control unit 103 instructs the image forming unit 110 to print the chart image and instructs the paper feeding control unit 104 to start feeding the transfer paper. In order to form the patch image on the back side, the front and back sides of the paper are reversed on the reverse conveying path 119 after the chart image is formed on the front side of the transfer paper under the control of the conveying control unit 106, and then the transfer paper is conveyed to the conveying path 115 at the upper stream side of the image forming unit 110.

s1003: Line Sensor Reading Instruction

Based on the detection-unit calibration chart information, the state management unit 101 instructs the line sensor control unit 107 and the colorimeter control unit 108 to read the chart image. At this process, the state management unit 101 sends a notification to the line sensor control unit 107 indicating that the operation mode is set at the detection-unit calibration mode. Further, the instruction is made to read the background board 115A on the conveying path 115 for the reading area bigger than the paper in order to determine the causes of the quality defect of the patch. This is because an area outside the paper is used by the quality determining unit 140 for quality determination described later below.

s1004: Line Sensor Reading

In response to the line sensor reading instruction, the line sensor control unit 107 reads, via the line sensor 130, the image including the patch that is formed on the transfer paper by the image forming unit 110. Then, the transfer paper image is sent to the storage unit 102 via the state management unit 101 and is stored therein.

s1005: Determining Patch Quality

The quality determining unit 140 reads the transfer paper image from the storage unit 102 to determine printing quality of each patch. The flow of determining printing quality is the same as the procedure shown in FIG. 9.

s1006: Colorimetric Instruction for Colorimeter

The state management unit 101 refers to the storage unit 102 and instructs the colorimeter control unit 108 to start the reading process.

In case that the distance of the colorimetry object conveying path 117A between the line sensor 130 and the spectral colorimeter 131 is so short that the determination by the patch quality determining unit 140 is not made in time for the transfer paper passing through the spectral colorimeter 131, control is performed so that the transfer paper can be inserted to the circulating path 118 to pass through the spectral colorimeter 131 again.

s1007: Reading Colorimeter

The colorimeter control unit 108 reads, with the spectral colorimeter 131, each patch formed on the transfer paper by the image forming unit 110. The colorimetric value of patch (L*a*b*/XYZ etc.) is sent to the storage unit 102 via the state management unit 101. Non-device-dependent L*a*b* or XYZ can be obtained by converting device-dependent RGB values or CMYK values of the color space using a profile. The profile can be stored in the storage unit 102.

s1008: Back Side Needed?

When the state management unit 101 refers to the storage unit 102 and there are those patches that are determined as being out of the quality standard by the quality determining unit 140, it is determined that reading of the patch on the back side is needed, and the transfer paper is reversed through the reverse path 119 and then returned to the colorimetric path 117A. Thus, even when the printing quality of the patch on the front side is out of the standard, the measurement values needed for the calibration can be obtained by reading the patch on the back side.

S1009: Calculating Calibration Value

The calibration unit 109 determines each patch from the transfer paper image and detects the patch density (RGB/CMYK) (Step s1005), calculates a calibration parameter to the line sensor 130 from the patch density and the colorimetric value of the spectral colorimeter 131, and then stores the calibration parameter in the storage unit 102. After that, the process is closed. When the line sensor 130 performs reading for the normal image forming calibration, the calibration value can be used for the calibration of the line sensor 130.

s1010: Check Needed?

When the operation mode is set at the calibration mode, the state management unit 101 sets the operation mode at the calibration check mode for checking the calibration accuracy by reading the chart again for checking the calibration result, and then returns to s301. When the operation mode is set at the calibration check mode, the calibration operation is completed.

Fourth Embodiment

When quality of the image read by the line sensor is higher than or equal to the predetermined quality in the embodiments above, the image is read by the spectral colorimeter. However, the image read by the line sensor can be read by the spectral colorimeter, and the calibration can be performed using only the detection result indicating that quality of the image read by the line sensor is higher than or equal to the predetermined quality. In the procedure below, the flows are the same as the first embodiment except the calibration flow and the quality determining flow, and therefore only the calibration flow and the quality determining flow are described below.

Figure 20:
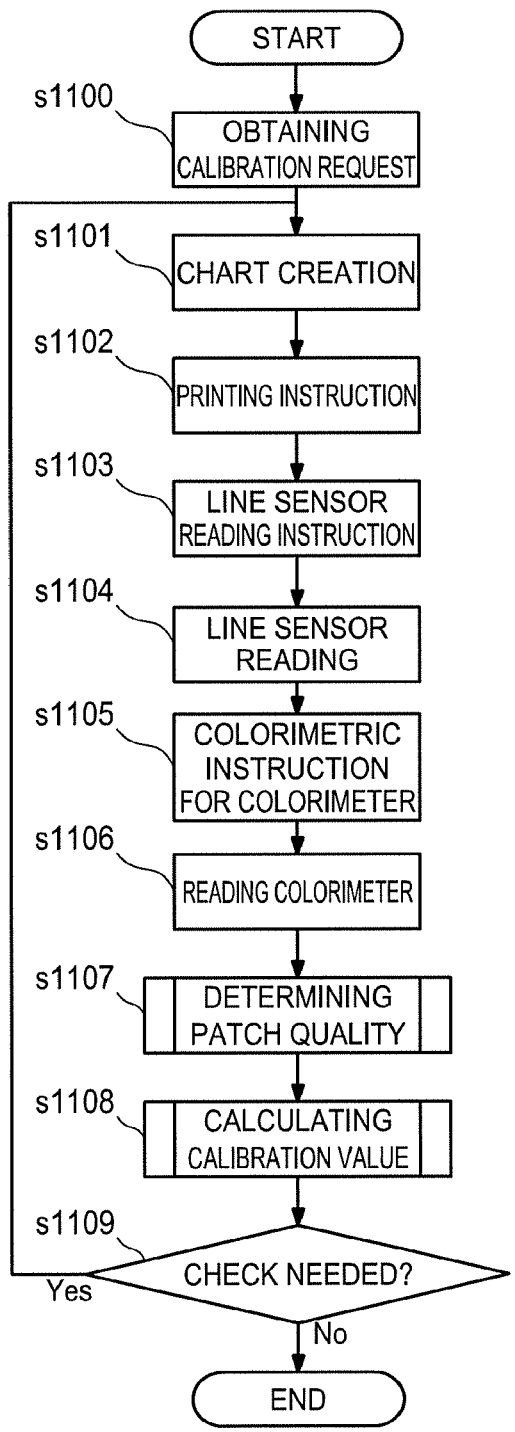
FIG. 20 shows a flowchart of procedure for a detection-unit calibration operation according to further another embodiment of the present invention.

First, the following describes procedure of the calibration flow with reference to the flowchart shown in FIG. 20. The following procedure is performed under control by the control unit 100.

s1100: Obtaining Calibration Request

When the detection-unit calibration procedure starts, the calibration unit 109 receives a line sensor calibration request from the state management unit 101.

s1101: Chart Creation

After obtaining the calibration request (Step s1100), the state management unit 101 sends the detection-unit calibration chart information stored in the storage unit 102 to the printing control unit 103. The printing control unit 103 creates a chart image for the detection-unit calibration (Step s1101).

s1102: Printing Instruction

After the creation of the calibration chart (Step s1101), the printing control unit 103 instructs the image forming unit 110 to print the chart image and also instructs the paper feeding control unit 104 to start feeding the transfer paper.

s1103: Line Sensor Reading Instruction

Based on the detection-unit calibration chart information, the state management unit 101 instructs the line sensor control unit 107 and the colorimeter control unit 108 to read the chart image. At this process, the state management unit 101 sends a notification to the line sensor control unit 107 indicating that the operation mode is set at the detection-unit calibration mode. Further, the instruction is made to read the background board 115A on the conveying path 115 for the reading area bigger than the paper in order to determine the causes of the defect of the patch. This is because an area outside the paper is used by the quality determining unit 140 for quality determination described later below.

s1104: Line Sensor Reading

In response to the line sensor reading instruction, the line sensor control unit 107 reads, via the line sensor 130, the image including the patch that is formed on the transfer paper by the image forming unit 110. Then, the transfer paper image is sent to the storage unit 102 via the state management unit 101 and is stored therein.

s1105: Colorimetric Instruction for Colorimeter

The state management unit 101 refers to the storage unit 102 and instructs the colorimeter control unit 108 to start the reading process.

In case that the distance of the colorimetry object conveying path 117A between the line sensor 130 and the spectral colorimeter 131 is so short that the determination by the quality determining unit 140 is not made in time for the transfer paper passing through the spectral colorimeter 131, control is performed so that the transfer paper can be to the circulating path 118 to pass through the spectral colorimeter 131 again.

s1106: Reading Colorimeter

The colorimeter control unit 108 reads, with the spectral colorimeter 131, each patch formed on the transfer paper by the image forming unit 110. The colorimetric value of patch (L*a*b*/XYZ etc.) is sent to the storage unit 102 via the state management unit 101. Non-device-dependent L*a*b* or XYZ can be obtained by converting device-dependent RGB values or CMYK values of the color space using a profile. The profile can be stored in the storage unit 102.

s1107: Determining Patch Quality

The quality determining unit 140 reads the transfer paper image from the storage unit 102 to determine printing quality of each patch. The flow of determining printing quality is the same as the procedure shown in FIG. 9.

s1108: Calculating Calibration Value

The calibration unit 109 determines each patch from the transfer paper image and detects the patch density (RGB/CMYK) (Step s1107), calculates a calibration parameter to the line sensor 130 from the patch density and the colorimetric value of the spectral colorimeter 131 for the transfer image of which patch quality is appropriate, and then stores the calibration parameter in the storage unit 102. After that, the process is closed. When the line sensor 130 performs reading for the normal image forming calibration, the calibration value can be used for the calibration of the line sensor 130.

s1109: Check Needed?

When the operation mode is set at the calibration mode, the state management unit 101 sets the operation mode at the calibration check mode for checking the calibration accuracy by reading the chart again for checking the calibration result, and then returns to s1101. When the operation mode is set at the calibration check mode, the calibration operation is completed.

Figure 21:
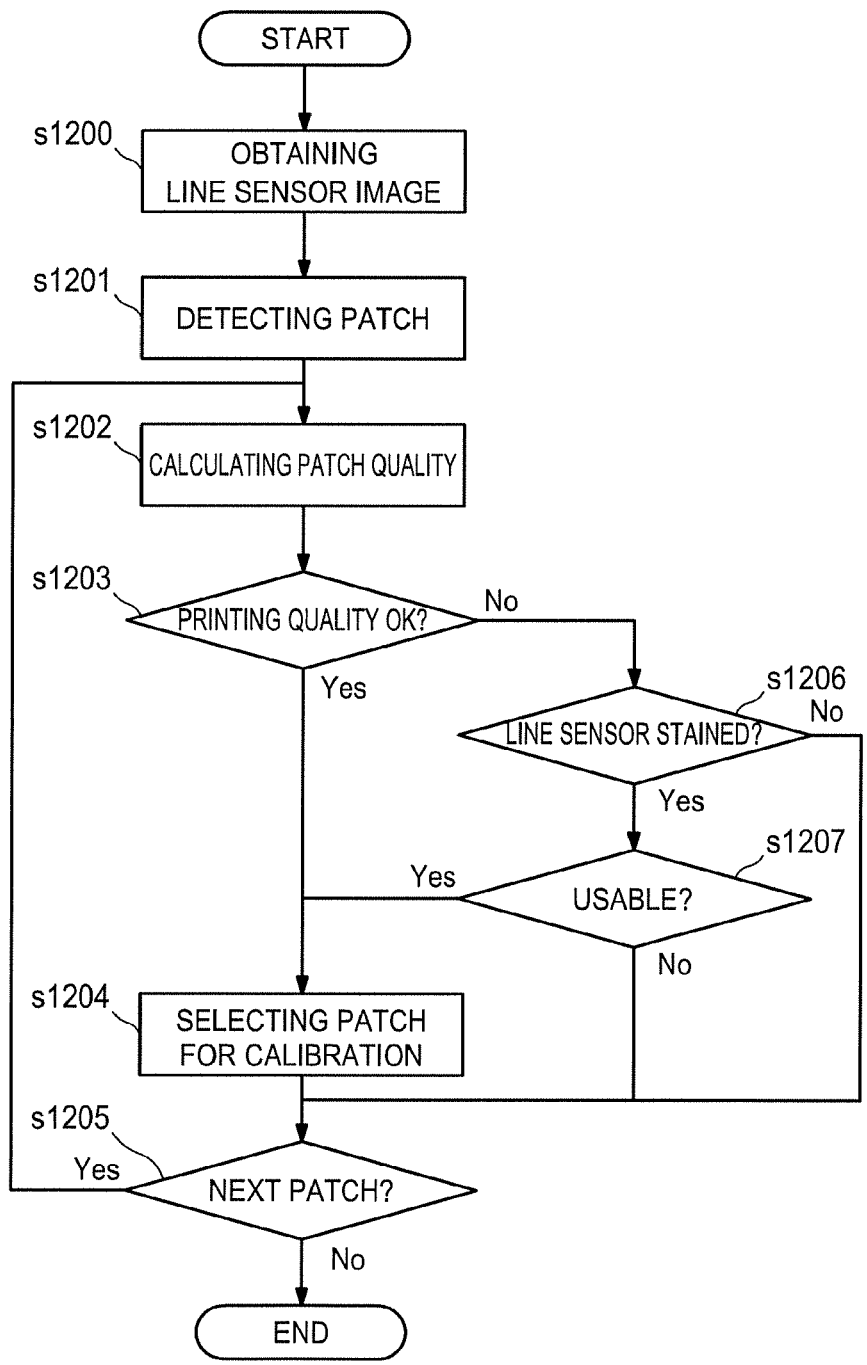
FIG. 21 shows a flowchart of procedure for patch quality determination thereof.

The following describes procedure of the quality determining flow with reference to the flowchart shown in FIG. 21. The following procedure is performed under control by the control unit 100.

s1200: Obtaining Line Sensor Image

The quality determining unit 140 obtains the transfer paper image read by the line sensor 130 from the storage unit 102 via the state management unit 101.

s1201: Detecting Patch

The quality determining unit 140 detects the patch position on the transfer paper image, based on the chart information stored in the storage unit 102 and the crop mark position on the read image.

The transfer paper image includes an image 115AG corresponding to the background board 115A on the conveying path 115 and the transfer images 321G to 329G corresponding to the patch images 321 to 329.

S1202: Calculating Patch Quality

The quality determining unit 140 samples pixel values (RGB/CMYK etc.) of the patch image on the read image based on the patch position. For example, the sum of the standard deviation of the patch pixel values of each color channel is calculated as a patch quality indicator indicating margin of error. The patch pixel values and the patch quality indicator are stored in the storage unit 102.

s1203: Printing Quality OK?

The quality determining unit 140 determines whether the patch quality indicator is within the patch quality standard.

s1204: Selecting Patch for Calibration

When the printing quality is within the quality standard (Step s1203, Yes), the quality determining unit 140 registers those patches that have the patch quality indicator within the patch quality standard as being usable for the calibration.

S1205: Next Patch?

The quality determining unit 140 refers to the chart information whether there is a next patch, and, if there is a next patch, moves on to Step s1202 to detect the patch. If there is no next patch, the procedure is closed.

s1206: Line Sensor Stained?

When the patch quality indicator is not within the quality standard at the quality determining unit 140 (Step s1203, No), it is determined whether the cause is printing of the chart or a stain of the line sensor 130.

The determination process is made on those patches that are determined as being out of the patch quality standard. When the cause is not a stain on the line sensor (Step s1206, No), the procedure moves on to Step s1205 to determine whether there is a next patch.

s1207: Usable?

The quality determining unit 140 determines whether the those patch images with defective images due to the stain of the line sensor 130 are usable for calibration or not.

The area with the stain on the patch is considered as a defective area. When the size of the defective area is the predetermined value (for example, below 30%) of the patch size, the pixel values outside the defective area are sampled again and updated on the storage unit 102 as the colorimetric values. Further, the patch is registered as being usable for the calibration by the spectral colorimeter 131. The predetermined value above is previously set and stored in the storage unit 102 and the like, or can be set by a user through the operation unit 121. When the patch image with a defective image is detected, a user can determine if the patch image is usable or not through the operation unit 121.

As for the transfer images 321G, 324G and 327G of the patch images 321, 324 and 327, which are defective due to a stain of the line sensor, the pixel values of the area excluding the line-shape noise are sampled again to be updated as the measurement values of the patch.

As for those patches that are determined as defective due to the chart printing at Step s1206, if the deficiency is small, the image can be processed and the area excluding the defective area can be colorimeter targets for the spectral colorimeter 131. For example, when there is a scratch or a line at the end of the patch, the color of the center of the patch can be measured by the spectral colorimeter 131 so that the deficiency can be avoided.

In this embodiment, the detection result from the second image detection unit is used depending on the quality result of the image read by the first image detection unit. Thus, there is an advantage that the calibration of the first image detection unit can be performed reliably and accurately.

The present invention is described in accordance with the embodiments above. However, the present invention can be modified arbitrarily without departing from the scope of the present invention.

What is claimed is:

1. An image forming system comprising:
    an image forming unit that forms an image on a recording medium;
    a conveying unit that conveys the recording medium through a conveying path;
    a line sensor that reads the image formed by the image forming unit on the recording medium conveyed by the conveying unit;
    a colorimeter that measures the image on the recording medium and is provided at the downstream side of the line sensor; and
    a control unit that receives a colorimetric result from the colorimeter and a reading result from the line sensor, wherein
    the control unit performs calibrations of the line sensor based on the colorimetric result from the colorimeter.

2. The image forming system of claim 1, wherein the line sensor comprises a charged coupled device (CCD) or comprises contact image sensors (CIS).

3. The image forming system of claim 1, wherein the line sensor covers the recording medium at a first region having a first width, and the colorimeter covers the recording medium at a second region having a second width that is less than the first width.

4. The image forming system of claim 1, further comprising a circulating path, wherein the circulating path diverges from the conveying path to allow the recording medium, with a first side of the recording medium facing up, to be conveyed from the conveying path to the circulating path, and the circulating path converges to the conveying path at an upstream side of the line sensor to allow the recording medium to be returned from the circulating path to the conveying path at a location upstream of the line sensor.

5. The image forming system of claim 4, wherein the circulating path diverges from the conveying path at a downstream side of the colorimeter.

6. The image forming system of claim 4, further comprising a reverse path controlled by the control unit and configured to reverse sides of the recording medium to allow the recording medium to be returned from the circulating path to the conveying path at the location upstream of the line sensor with a second side of the recording medium facing up.

7. The image forming system of claim 1, wherein the line sensor and the colorimeter are provided in the image forming unit, and the image forming unit is provided in an image forming apparatus.

8. The image forming system of claim 1, further comprising
    an image forming apparatus; and
    a post-processing apparatus connected to a downstream side of the image forming apparatus, wherein
    the image forming apparatus comprises the image forming unit, the line sensor is provided in the image forming unit, and the colorimeter is provided in the post-processing apparatus.

9. The image forming system of claim 1, further comprising
    an image forming apparatus; and
    a post-processing apparatus connected to a downstream side of the image forming apparatus, wherein
    the image forming apparatus comprises the image forming unit, and the line sensor and the colorimeter are provided in the post-processing apparatus.

10. The image forming system of claim 1, wherein the calorimeter is a spectral colorimeter.

11. The image forming system of claim 1, wherein one or more rollers are located downstream of the line sensor and upstream of the colorimeter.

12. The image forming system of claim 1, wherein the image forming unit is a fixing device configured to form the image on the recording medium via heat-fixing.

* * * * *